US008767270B2

(12) United States Patent
Curry et al.

(10) Patent No.: US 8,767,270 B2
(45) Date of Patent: Jul. 1, 2014

(54) SINGLE-PASS IMAGING APPARATUS WITH IMAGE DATA SCROLLING FOR IMPROVED RESOLUTION CONTRAST AND EXPOSURE EXTENT

(75) Inventors: Douglas N. Curry, San Mateo, CA (US); Timothy David Stowe, Alameda, CA (US); Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 277 days.

(21) Appl. No.: 13/216,702

(22) Filed: Aug. 24, 2011

(65) Prior Publication Data

US 2013/0050775 A1 Feb. 28, 2013

(51) Int. Cl.
| G02B 26/00 | (2006.01) |
| G02B 26/08 | (2006.01) |
| G02B 26/10 | (2006.01) |
| G02B 26/12 | (2006.01) |
| H04N 1/04 | (2006.01) |

(52) U.S. Cl.
USPC ........... 358/474; 359/223; 359/224; 359/290; 359/291; 359/292

(58) Field of Classification Search
CPC combination set(s) only.
See application file for complete search history.

(56) References Cited

U.S. PATENT DOCUMENTS

| 3,800,699 A | 4/1974 | Carley |
| 5,041,851 A | 8/1991 | Nelson |
| 5,101,236 A | 3/1992 | Nelson et al. |
| 5,105,207 A | 4/1992 | Nelson |
| 5,105,369 A | 4/1992 | Nelson |
| 5,151,718 A | 9/1992 | Nelson |
| 5,500,670 A | 3/1996 | Ang et al. |
| 5,563,398 A * | 10/1996 | Sampsell ...................... 235/454 |
| 5,719,682 A | 2/1998 | Venkateswar |
| 5,721,622 A | 2/1998 | Venkateswar |
| 5,754,217 A | 5/1998 | Allen |
| 5,953,152 A | 9/1999 | Hewlett |
| 5,954,424 A * | 9/1999 | Anderson et al. ............. 362/242 |
| 5,997,150 A | 12/1999 | Anderson |
| 6,121,984 A * | 9/2000 | Anderson ...................... 347/135 |
| 6,529,261 B2 | 3/2003 | Shinada |

(Continued)

FOREIGN PATENT DOCUMENTS

| EP | 0957384 A2 | 11/1999 |
| EP | 1155865 A2 | 11/2001 |
| EP | 1327527 A1 | 7/2003 |
| WO | 2006/083004 A2 | 8/2006 |

*Primary Examiner* — Marivelisse Santiago Cordero
*Assistant Examiner* — Moustapha Diaby
(74) *Attorney, Agent, or Firm* — Bever, Hoffman & Harms, LLP; Patrick T. Bever

(57) ABSTRACT

An imaging (e.g., lithographic) apparatus for generating an elongated concentrated scan image on an imaging surface of a scan structure (e.g., a drum cylinder) that moves in a process (cross-scan) direction. The apparatus includes a spatial light modulator having a two-dimensional array of light modulating elements for modulating a two-dimensional light field in response to predetermined scan image data, and an anamorphic optical system is used to anamorphically image and concentrate the modulated light onto an elongated imaging region defined on the imaging surface. To avoid smearing, movement of the imaging surface is synchronized by an image position controller with the modulated states of the light modulating elements such that image features of the scan image are scrolled (moved in the cross-scan direction) at the same rate as the cross-scan movement of the imaging surface, whereby the features remain coincident with the same portion of the imaging surface.

16 Claims, 18 Drawing Sheets

(56) References Cited

U.S. PATENT DOCUMENTS

| | | | |
|---|---|---|---|
| 6,552,777 | B2 | 4/2003 | Sunagawa |
| 6,567,217 | B1 | 5/2003 | Kowarz et al. |
| 6,606,739 | B2 | 8/2003 | Kanatake et al. |
| 6,724,546 | B2 | 4/2004 | Nishimae et al. |
| 7,048,388 | B2 | 5/2006 | Takaura et al. |
| 7,154,640 | B2 | 12/2006 | Ishihara |
| 7,218,380 | B2 | 5/2007 | De Jager |
| 7,508,570 | B1 | 3/2009 | Meisburger |
| 8,031,390 | B2 | 10/2011 | Grasser et al. |
| 8,104,901 | B2 | 1/2012 | Kwon |
| 8,199,178 | B1 | 6/2012 | Payne |
| 8,282,221 | B2 | 10/2012 | Arai et al. |
| 8,520,045 | B2 | 8/2013 | Maeda |
| 2002/0044265 | A1 | 4/2002 | Sumi |
| 2002/0140801 | A1 * | 10/2002 | kubota ................. 347/239 |
| 2002/0171878 | A1 | 11/2002 | Nakajima |
| 2004/0190573 | A1 | 9/2004 | Kruschwitz et al. |
| 2008/0055391 | A1 | 3/2008 | Sakamoto et al. |
| 2008/0062390 | A1 | 3/2008 | Zhang et al. |
| 2010/0165426 | A1 | 7/2010 | Kihara et al. |
| 2010/0208329 | A1 | 8/2010 | Sandstrom et al. |
| 2013/0050669 | A1 | 2/2013 | Maeda |

* cited by examiner

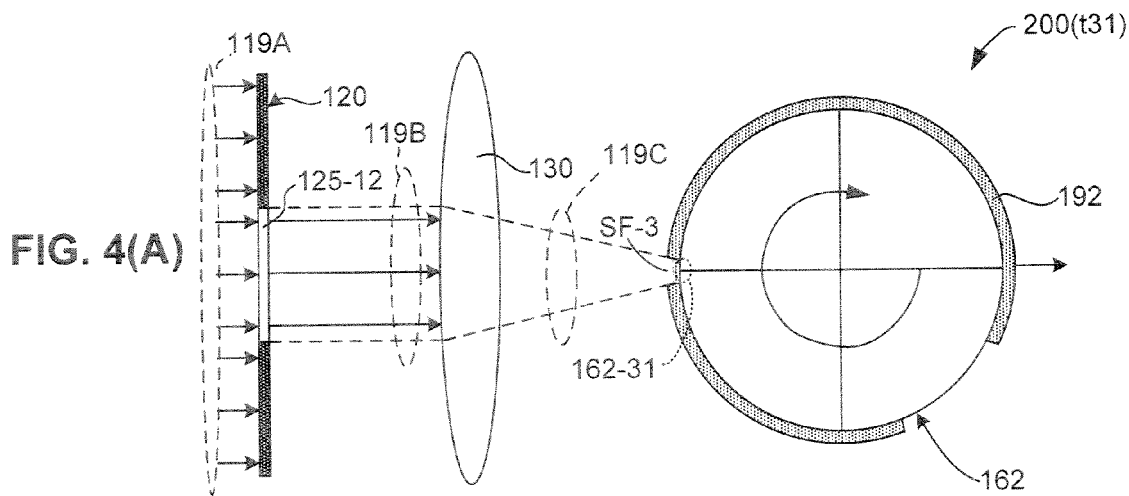
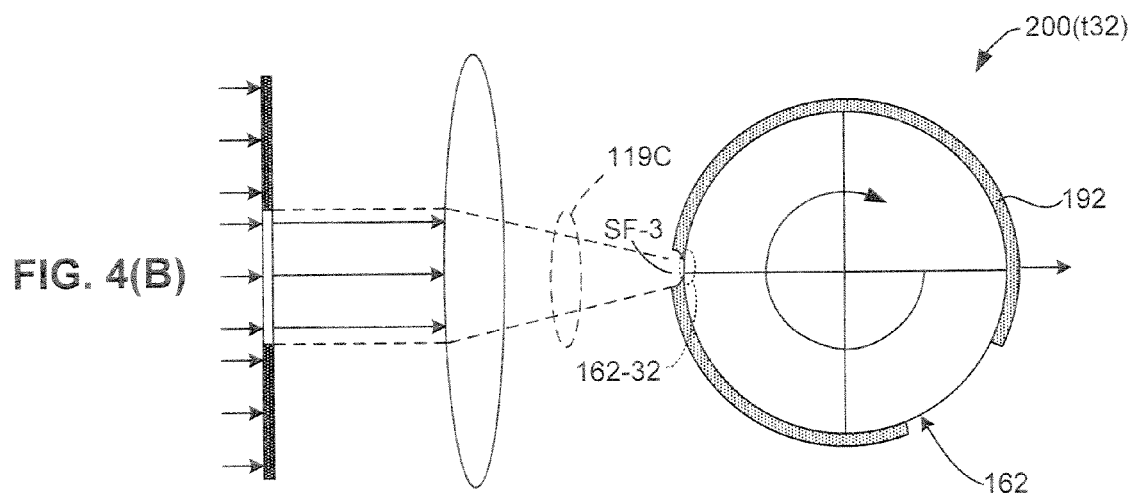
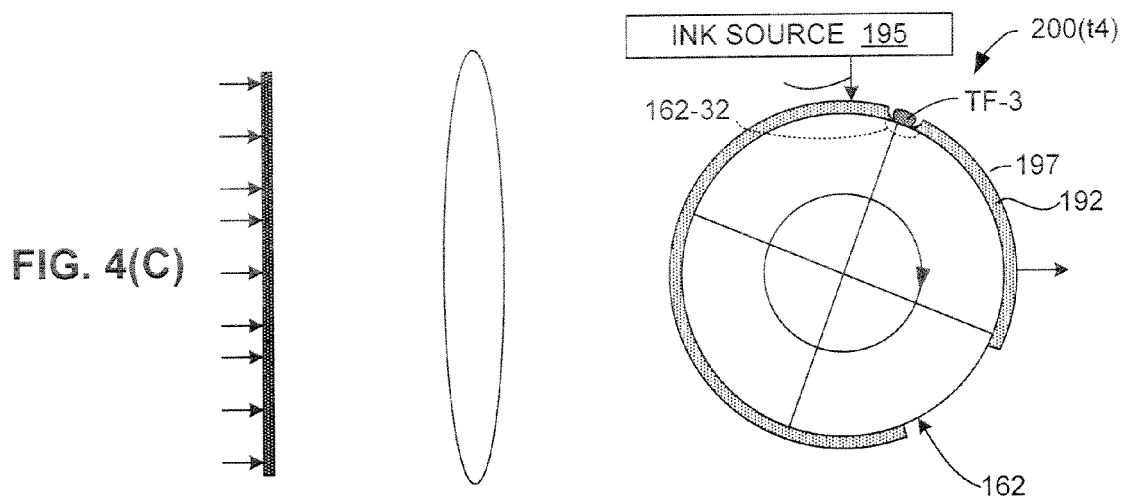

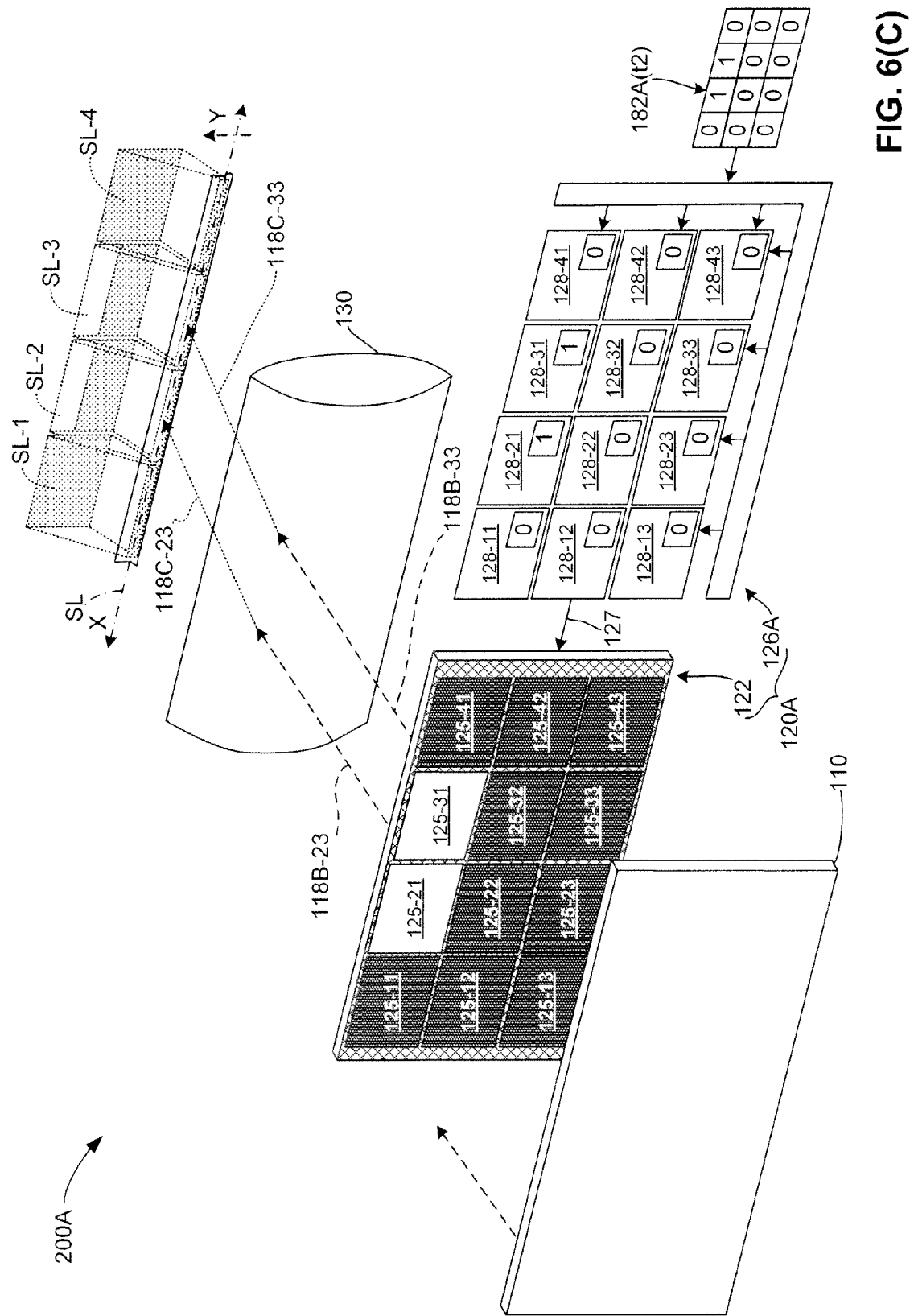

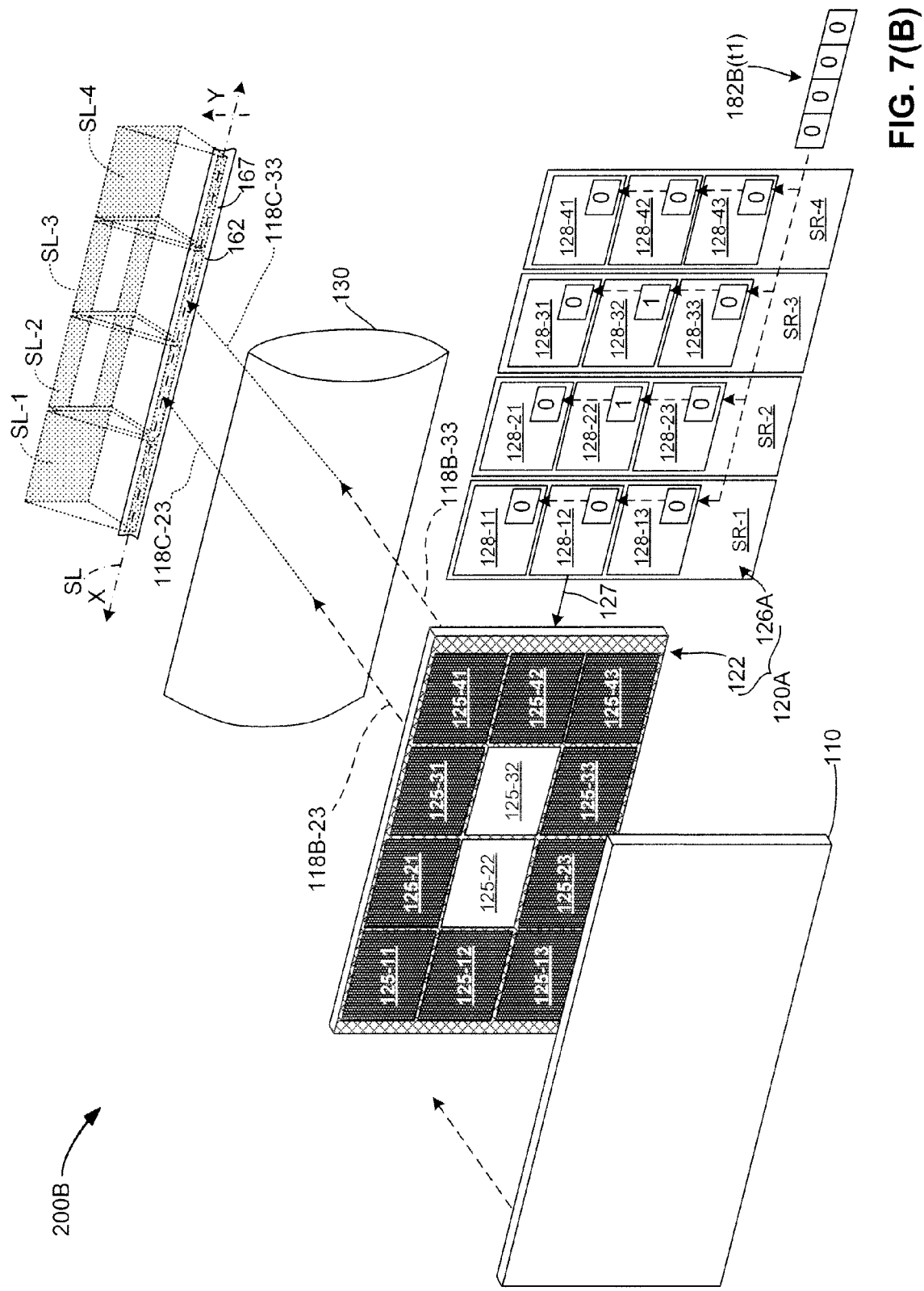

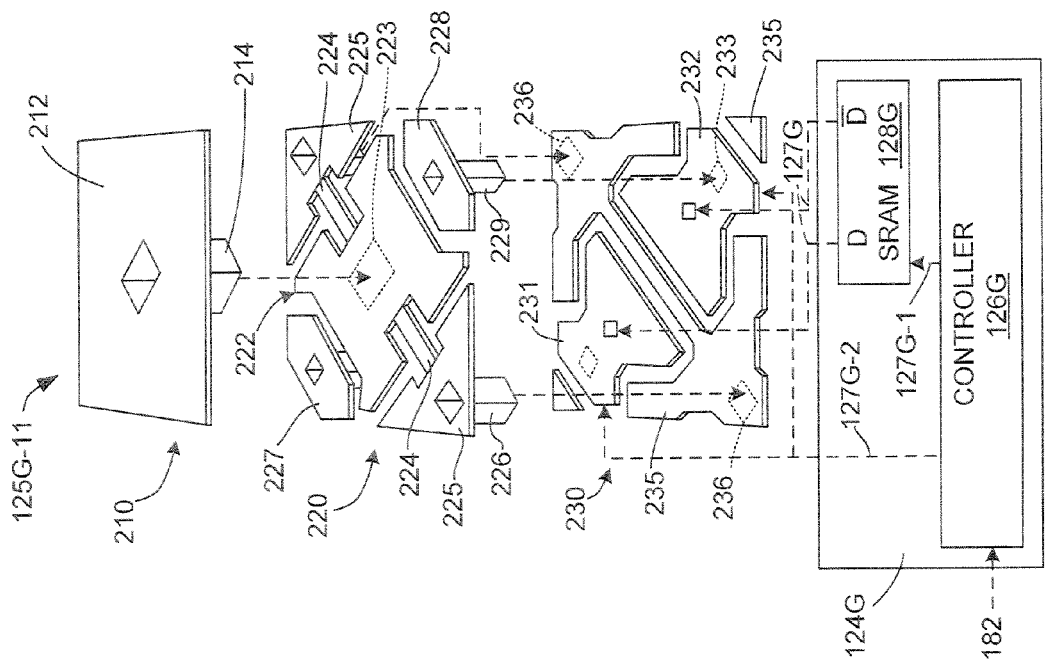
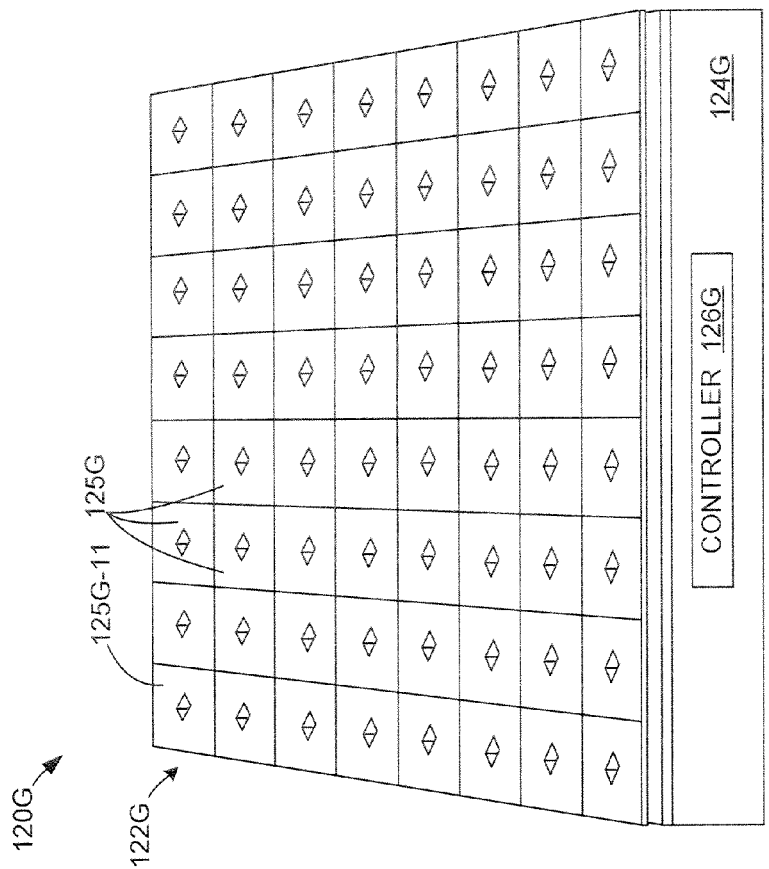
FIG. 10 (PRIOR ART)
FIG. 11 (PRIOR ART)

SINGLE-PASS IMAGING APPARATUS WITH IMAGE DATA SCROLLING FOR IMPROVED RESOLUTION CONTRAST AND EXPOSURE EXTENT

FIELD OF THE INVENTION

This invention relates to imaging apparatus, and in particular to single-pass, nigh resolution imaging apparatus for high speed image generation.

BACKGROUND OF THE INVENTION

Laser imaging systems are extensively used to generate images in applications such as mask and maskless lithographic patterning, laser texturing of surfaces, and laser cutting machines. Laser printers often use a raster optical scanner (ROS) that sweeps a laser perpendicular to a process direction by utilizing a polygon or galvo scanner, whereas for cutting applications lasers imaging systems use flatbed x-y vector scanning.

One of the limitations of the laser ROS approach is that there are design tradeoffs between image resolution and the lateral extent of the scan line. These tradeoffs arise from optical performance limitations at the extremes of the scan line such as image field curvature. In practice, it is extremely difficult to achieve 1200 dpi resolution across a 20" imaging swath with single galvanometers or polygon scanners. Furthermore, a single laser head motorized x-y flatbed architecture, ideal for large area coverage, is too slow for most high speed printing processes.

For this reason, monolithic light emitting diode (LED) arrays of up to 20" in width have an imaging advantage for large width xerography. Unfortunately, present LED array are only capable of offering 10 milliWatt power levels per pixel and are therefore only useful for some non-thermal imaging applications such as xerography. In addition, LED bars have differential aging and performance spread. If a single LED fails it requires the entire LED bar be replaced. Many other imaging or marking applications require much higher power. For example, laser texturing, or cutting applications can require power levels in the 10 W-100 W range. Thus LED bars cannot be used for these high power applications. Also, it is difficult to extend LEDs to higher speeds or resolutions above 1200 dpi without using two or more rows of staggered heads.

Higher power semiconductor laser arrays in the range of 100 mW-100 Watts do exist. Most often they exist in a 1D array format such as on a laser diode bar often about 1 cm in total width. Another type of high power directed light source are 2D surface emitting VCSEL arrays. However, neither of these high power laser technologies allow for the laser pitch between nearest neighbors to be compatible with 600 dpi or higher imaging resolution. In addition, neither of these technologies allow for the individual high speed control of each laser. Thus high power applications such as high power overhead projection imaging systems, often use a high power source such as a laser in combination with a spatial light modulator such as a DLP™ chip from Texas Instruments or liquid crystal arrays.

Prior art has shown that if imaging systems are arrayed side by side, they can be used to form projected images that overlap wherein the overlap can form a larger image using software to stitch together the image patterns into a seamless pattern. This has been shown in many maskless lithography systems such as those for PC board manufacturing as well as for display systems. In the past such arrayed imaging systems for high resolution applications have been arranged in such a way that they must use either two rows of imaging subsystems or use a double pass scanning configuration in order to stitch together a continuous high resolution image. This is because of physical hardware constraints on the dimensions of the optical subsystems. The double imaging row configuration can still be seamlessly stitched together using a conveyor to move the substrate in single direction but such a system requires large amount of overhead hardware real estate and precision alignment between each imaging row.

For the maskless lithography application, the time between exposure and development of photoresist to be imaged is not critical and therefore the imaging of the photoresist along a single line does not need be exposed at once. However, sometimes the time between exposure and development is critical. For example, xerographic laser printing is based on imaging a photoreceptor by erasing charge which naturally decays over time. Thus the time between exposure and development is not time invariant. In such situations, it is desirable for the exposure system to expose a single line, or a few tightly spaced adjacent lines of high resolution of a surface at once.

In addition to xerographic printing applications, there are other marking systems where the time between exposure and development are critical. One example is the laser based variable data lithographic marking approach originally disclosed by Carley in U.S. Pat. No. 3,800,699 entitled, "FOUNTAIN SOLUTION IMAGE APPARATUS FOR ELECTRONIC LITHOGRAPHY". In standard offset lithographic printing, a static imaging plate is created that has hydrophobic imaging and hydrophilic non-imaging regions. A thin layer of water based dampening solution selectively wets the plate and forms an oleophobic layer which selectively rejects oil-based inks. In variable data lithographic marking disclosed in U.S. Pat. No. 3,800,699, a laser can be used to pattern ablate the fountain solution to form variable imaging regions on the fly. For such a system, a thin layer of dampening solution so decays in thickness over time, due to natural partial pressure evaporation into the surrounding air. Thus it is also advantageous to form a single continuous high power laser imaging line pattern formed in a single imaging pass step so that the liquid dampening film thickness is the same thickness everywhere at the image forming laser ablation step. However, for most arrayed high power high resolution imaging systems, the hardware and packaging surrounding a spatial light modulator usually prevent a seamless continuous line pattern to be imaged. Furthermore, for many areas of laser imaging such as texturing, lithography, computer to plate making, large area die cutting, or thermal based printing or other novel printing applications, what is needed is laser based imaging approach with high optical power well above the level of 1 Watt that is scalable across large process widths in excess of 20" as well as having achievable resolution greater than 1200 dpi and high resolution high speed imaging in a single pass.

SUMMARY OF THE INVENTION

The present invention is generally directed to an imaging, (e.g., lithographic) apparatus in which an elongated substantially one-dimensional scan image is generated according to predetermined image data on an imaging surface of a scan structure (e.g., a drum cylinder) that moves in a process (cross-scan) direction. The present invention is particularly directed to such an imaging apparatus in which a spatial light modulator having a two-dimensional array of light modulating elements is used to modulate a two-dimensional light field in response to predetermined scan image data, and then the modulated light is anamorphically imaged in the process and cross process directions, and concentrated in the process direction onto an elongated imaging region defined on the imaging surface. A potential problem with this arrangement is that if all of the data rasters in the array change simultaneously while the imaging surface moves in the process direction, then smearing of the transferred image may result (i.e., deformation of the transfer material disposed on the imaging surface that is processed by the scan image). To avoid this smearing, according to an aspect of the present invention, an image position controller is utilized to synchronize the process direction movement of the imaging surface with the modulated states of the light modulating elements, for example, by causing the image data bit values to shift (raster) through the light modulating elements, whereby image features of the scan image are scrolled (shifted in the process direction) at a rate that matches the process direction movement of the imaging surface, thereby causing the image features to remain substantially coincident with corresponding portions or the imaging surface even though the image surface portions move in the process direction. In addition to avoiding the smearing problem, by rastering the scan image features in synchronization with movement of the imaging surface, the present invention also increases the exposure time associated with each image feature on the imaging surface, thereby facilitating reduced peak power of the supplied homogenous light field while maintaining total power transfer to the scan surface, thus reducing the overall cost of the imaging apparatus by allowing the use of low-power light sources.

According to an embodiment of the present invention, the imaging apparatus includes a commercially available homogenous light generator (e.g., LIMO High Power Laser Diode Line Generators) to generate constant homogenous light that is spread (dispersed) evenly over a two-dimensional light field, a spatial light modulator disposed in the light field that modulates the homogenous light according to the predetermined scan line image data, and an anamorphic optical system that images the modulated homogenous light in the process and cross-process directions and concentrates the modulated homogenous light in the process direction to form the substantially one-dimensional scan line image on the imaging surface of the scan structure. By utilizing the anamorphic optical system to image and concentrate the modulated homogenous light, high total optical power (i.e., on the order of hundreds of Watts) can be selectively simultaneously generated on any point of the scan line image and without requiring a high power laser light source, thereby facilitating a cost-effective imaging apparatus that can be used, for example, for single-pass scanning and printing applications with high speed line addressing over 30 kHz.

According to an aspect of the present invention, the spatial light modulator includes multiple light modulating elements arranged in a two-dimensional array, where each light modulating element includes a light modulating structure and an associated control cell for storing an associated image data bit value, whose value is determined by the predetermined scan image data. Each light modulating element is disposed in the array such that its light modulating structure receives an associated light portion of the two-dimensional homogenous light field, where the light modulating structure is controlled according to the associated image data bit value to change between an "on" modulated state and an "off" modulated state. When the light modulating structure of a modulating element is in the "on" modulated state, the light modulating structure directs its associated light portion toward the anamorphic optical system. Conversely, when the light modulating structure is in the "off" modulated state, the received associated light portion is prevented from passing to (e.g., blocked or diverted away from) the anamorphic optical system. By modulating homogenous light in this manner prior to being anamorphically imaged and concentrated, the present invention is able to produce a high power scan line along the entire imaging region simultaneously, as compared with a rastering system that only applies high power to one point of the scan line at any given instant. In addition, because the relatively low power homogenous light is spread over the large number of modulating elements, the present invention can be produced using low-cost, commercially available spatial light modulating devices, such as digital micromirror (DMD) devices, electro-optic diffractive modulator arrays, or arrays of thermo-optic absorber elements.

According to an embodiment of the present invention, the arrayed light modulating elements of the spatial light modulator are arranged in rows and columns, the anamorphic optical system is arranged to image and concentrate light portions received from each column onto an associated portion ("pixel") of the elongated scan line image, and the process of causing image data bit values to shift (raster) involves sequentially shifting image data bit values along the sequentially arranged light modulating elements in each column. That is, the imaged and concentrated modulated light portions received from the light modulating elements that are illuminated in a given column (in the on modulated state) are directed by the anamorphic optical system onto the same corresponding scan line portion of the scan line image so that the resulting imaging "pixel" is the composite light from the illuminated light modulating elements in given column that are in the "on" state. A key aspect of the present invention lies in understanding that the light portions passed (by transmission or reflection) by each light modulating element represent one pixel of binary data that is delivered to the scan line by the anamorphic optical system, and the region of the imaging surface that receives the imaged and concentrated light is minutely shifted in the process direction according to which elements in each column are "on". Accordingly, by individually controlling the multiple modulating elements disposed in each column such that image data bits are shifted upward (or downward) along the column, the present invention provides an imaging apparatus that avoids the smearing issue.

According to an embodiment of the present invention, data shifting is accomplished by updating and writing data to each control cell of the spatial light modulator during each sub-scan time interval. For example, curing a first sub-imaging time interval, a first data frame, which includes at least one data bit for each light modulating elements in the array, is transmitted and stored in the control cells of the light modulating elements, whereby the light modulating elements enter first modulated states. Before the next sequential sub-scan time interval, a modified (second) data frame is generated in which some of the data is effectively shifted in a predetermined pattern (e.g., corresponding to the upward shift of data along each column), and new data is added (e.g., corresponding to the lowermost row of light modulating elements). The modified data frame is transmitted and stored in the control cells of the light modulating elements during the next sub-scan time interval, and the modification process is repeated. Note that this process requires writing similar data multiple times as the data rasters up the spatial light modulator, and requires very high data transmission rates.

According to an alternative embodiment of the present invention, the architecture of the spatial light modulator is modified to include a shift register format that simplifies the process of rastering data between associated light modulating elements in order to implement the image scrolling operation more efficiently. That is, the spatial light modulator is modified to include at least one shift register circuit that shifts data bit values, e.g., between the control cells disposed in each column of the array. With this arrangement, one row of "new" data is written to the spatial light modulator during each sub-scan time interval, and all previously received data is shifted by the shift register circuits to associated adjacent light modulating elements. For example, when a "new" data bit is written to the control cell of a bottommost light modulating element in a column, the data value previously stored by the bottommost light modulating element is shifted upward to the light modulating element disposed immediately above the bottommost light modulating element. With this arrangement, each sub-scan row of the array receives its rasterized data vector from its adjacent and preceding sub-scan row at each sub-scan time interval, the first sub-scan row being updated as necessary (and only once per raster) as each new data raster boundary is encountered. This shift register format approach greatly improves efficiency by dramatically reducing bandwidth requirements (e.g., by a factor of 1000 if there were 1000 rows of light modulating elements in the spatial light modulator).

According to an embodiment of the present invention, the commercially available homogenous light generator (e.g., LIMO High Power Laser Diode Line Generators) includes one or more light sources and a light homogenizer optical system (e.g., one or more tapered light pipes or a microlens array) for homogenizing light beams generated by the light sources, and for spreading the homogenized light beams onto two or more of the light modulating elements. One benefit of converting a high energy density beam (i.e., light having a first, relatively high flux per unit area) to relatively low energy per unit area homogenous light (i.e., light having a second flux density that is lower than the flux density of the high energy density beam) in this manner is that this arrangement facilitates the use of a high energy light source (e.g., a laser or light emitting diode) without requiring the construction of spatial light modulator using special optical materials and antireflective coatings that can handle the high energy light. That is, by utilizing a homogenizer to spread the high energy laser light out over an extended two-dimensional area, the intensity (Watts/cc) of the light over a given area (e.g., over the area of each modulating element) is reduced to an acceptable level such that low cost optical materials and antireflective coatings can be utilized to form spatial light modulator. Another benefit of converting high energy beam to relatively low energy homogenous light is that this arrangement provides improved power handling capabilities. Spreading the light out also eliminates the negative imaging effects that point defects (e.g., microscopic dust particles or scratches) have on total light transmission losses. According to alternative specific embodiments, the light source of the homogenous light generator includes multiple low power light generating elements that collectively produce the desired light energy. In one specific embodiment, the light sources (e.g., edge emitting laser diodes or light emitting diodes) are arranged along a line that is parallel to the rows of light modulating elements. In another specific embodiment, the light sources (e.g., vertical cavity surface emitting lasers (VCSELs)) are arranged in a two-dimensional array. For high power homogenous light applications, the light source is preferably composed of multiple lower power light sources whose light emissions are mixed together by the homogenizer optics and produce the desired high power homogenous output. An additional benefit of using several independent light sources is that laser speckle due to coherent interference is reduced.

According to another embodiment of the present invention, the overall anamorphic optical system includes a cross-process optical subsystem and a process-direction optical subsystem that concentrate the modulated light portions received from the spatial light modulator such that the concentrated modulated light forms the substantially one-dimensional scan line image, wherein the concentrated modulated light at the scan line image has a higher optical intensity (i.e., a higher flux density) than that of the homogenized light. By anamorphically concentrating (focusing) the two-dimensional modulated light pattern to form a high energy elongated scan line, the imaging system of the present invention outputs a higher intensity scan line. The scan line is usually directed towards and swept over a moving imagine surface near its focus. This allows an imaging system to be formed such as a printer. The direction of the surface sweep is usually perpendicular to the direction of the scan line and is customarily called the process direction. In addition, the direction parallel to the scan line is customarily called the cross-process direction. The scan line image formed may have different pairs of cylindrical or acylindrical lens that address the converging and tight focusing of the scan line image along the process direction and the projection and magnification of the scan line image along the cross-process direction. In one specific embodiment, the cross-process optical subsystem includes first and second cylindrical or acylindrical lenses arranged to project and magnify the modulated light onto the elongated scan line in a cross-process direction, and the process-direction optical subsystem includes a third cylindrical or acylindrical focusing lens arranged to concentrate and demagnify the modulated light on the scan line in a direction parallel to a process direction. This arrangement facilitates generating a wide scan line that can be combined ("stitched" or blended together with a region of overlap) with adjacent optical systems to produce an assembly having a substantially unlimited length scan line. An optional collimating field lens may also be disposed between the spatial light modulator and cylindrical or acylindrical focusing lens in both the process and cross-process direction. It should be understood that the overall optical system may have several more elements to help compensate for optical aberrations or distortions and that such optical elements may be transmissive lenses or reflective mirror lenses with multiple folding of the beam path.

According to a specific embodiment of the present invention, the spatial light modulator comprises a DLP™ chip from Texas Instruments, referred to as a Digital Light Processor in the packaged form. The semiconductor chip itself is often referred to as a Digital Micromirror Device or DMD. This DMD includes an two dimensional array of microelectromechanical (MEMs) mirror mechanisms disposed on a substrate, where each MEMs mirror mechanism includes a mirror that is movably supported between first and second tilted positions according to associated control signals generated by a controller. The spatial light modulator and the anamorphic optical system are positioned in a folded arrangement such that, when each mirror is in the first tilted position, the mirror reflects its associated received light portion toward the anamorphic optical system, and when the mirror is in the second tilted position, the mirror reflects the associated received light portion away from the anamorphic optical system towards a beam dump. An optional heat sink is fixedly positioned relative to the spatial light modulator to receive light portions from mirrors disposed in the second tilted position towards the beam dump. An optional frame is utilized to maintain each of the components in fixed relative position. An advantage of a reflective DMD-based imaging system is that the folded optical path arrangement facilitates a compact system footprint.

According to another specific embodiment of the present invention, a spatial light modulator is modified to include shift register circuits that are constructed according to known techniques to facilitate shifting the data bit values between the control cells of associated MEMs mirror mechanism in each column using the shift register format discussed above. Changing the DMD memory architecture from random access memory to shift register format reduces the bandwidth requirements by a factor of the reciprocal of the number of mirror rows on the DMD array.

BRIEF DESCRIPTION OF THE DRAWINGS

These and other features, aspects and advantages of the present invention will become better understood with regard to the following description, appended claims, and accompanying drawings, where:

FIGS. 4(A), 4(B) and 4(C) are simplified side views showing the apparatus of FIG. 2 during a single-frame scan operation using a relatively low powered light source;

FIGS. 6(A), 6(B) and 6(C) are partial perspective views showing an imaging apparatus during a synchronized scan operation according to a specific embodiment of the present invention;

FIGS. 7(A), 7(B) and 7(C) are partial perspective views showing an imaging apparatus during a synchronized scan operation using shift registers according to another specific embodiment of the present invention;

FIG. 10 is a perspective view showing a portion of a DMD-type spatial light modulator utilized by the apparatus of FIG. 2 according to a specific embodiment of the present invention;

FIG. 11 is an exploded perspective view showing a modulating element of the DMD-type spatial light modulator of FIG. 10 in additional detail;

DETAILED DESCRIPTION OF THE DRAWINGS

The present invention relates to improvements in imaging systems and related apparatus (e.g., scanners and printers). The following description is presented to enable one of ordinary skill in the art to make and use the invention as provided in the context of a particular application and its requirements. As used herein, directional terms such as "upper", "upwards", "lower", "downward", "front", "rear", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
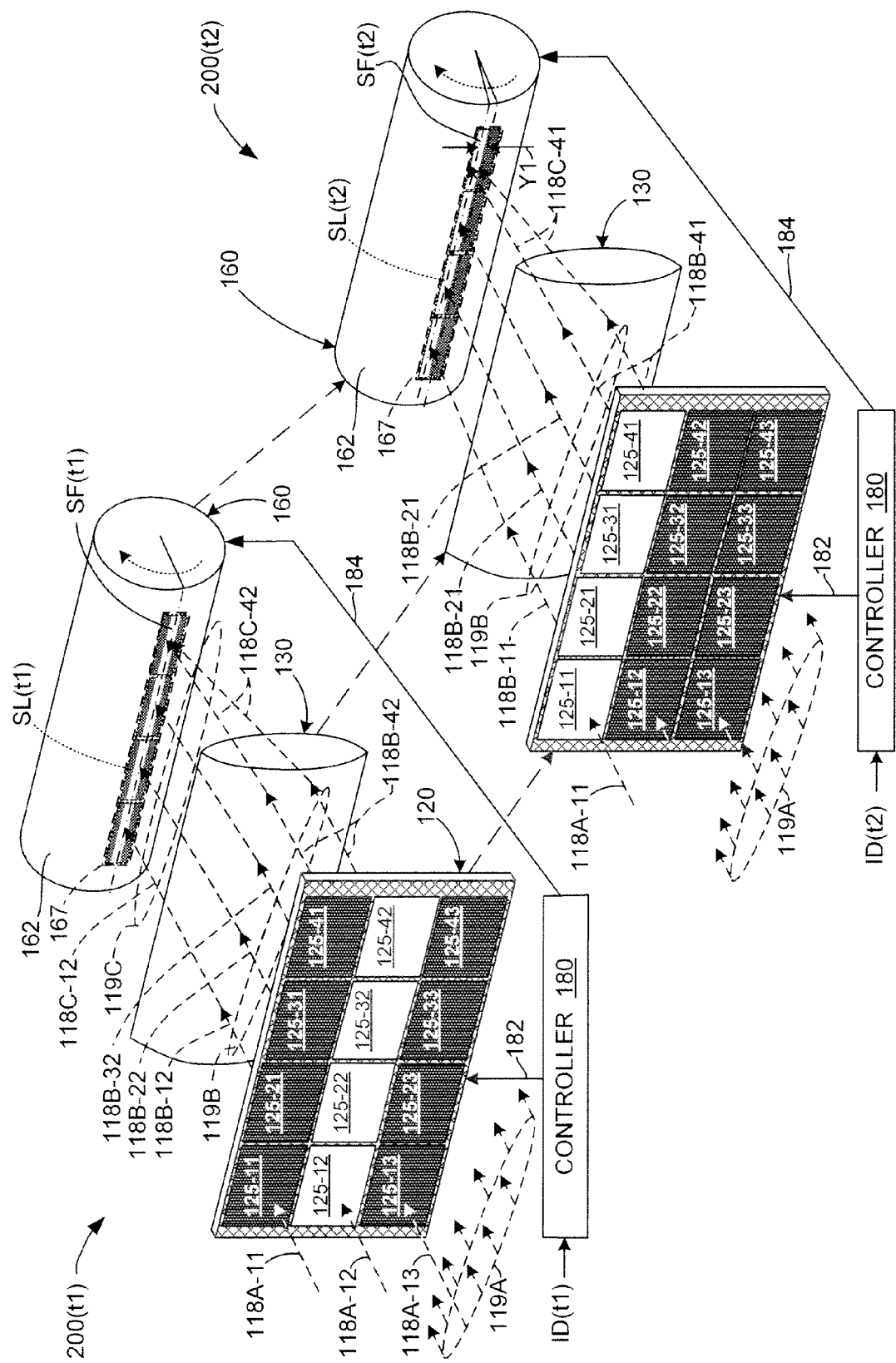
FIG. 1 is a two-part perspective view depicting synchronization of an imaging surface with a projected scan image according to an exemplary embodiment of the present invention.

FIG. 1 is a two-part perspective view depicting the operating state of a simplified imaging (e.g., lithographic) apparatus 200 at two different times (i.e., apparatus "200(t0)" depicts the operating state at an initial time t0, and apparatus "200(t1)" depicts the operating state at a subsequent time t1 that occurs shortly after time t0). Referring to the upper left portion of FIG. 1, apparatus 200 generally includes a spatial light modulator 120 or other device that modulates the two-dimensional homogenous light field 119A in accordance with predetermined scan line image data such that the modulated light forms a two-dimensional modulated light field 119B, an anamorphic optical system 130 for anamorphically concentrating the modulated light field 119B (e.g., as shown in the upper right portion of FIG. 1, divergent or parallel modulated light portions 118B-42 become converged modulated light portions 118C-42) such that the concentrated modulated light forms the substantially one-dimensional scan line image SL on a elongated imaging region 167 of the imaging surface 162, which in the exemplary embodiment is disposed on a drum cylinder (roller-type) imaging structure 160 that turns about a central axis as indicated by the curved arrow. Spatial light modulator 120 includes an array of light modulating elements 125-11 to 125-43 disposed in the two-dimensional homogenous light field 119A such that each light modulating element passes or blocks/deflects an associated homogenous light portion in accordance with its modulated state in the manner described in additional detail below (e.g., light modulating element 125-12 is in an on modulated state in which modulated light portion 118B-12 is passed to anamorphic optical system 130, and light modulating element 125-11 is in an "off" modulated state in which the passage of associated homogenous light portion 118A-11 is blocked/deflected). The substantially one-dimensional scan line image SL formed on elongated imaging region 167 by anamorphic optical system 130 is therefore determined by which of the on/off modulated state pattern of light modulating elements 125-11 to 125-43. For example, referring to the upper left portion of FIG. 1, the on/off modulated state pattern of light modulating elements 125-11 to 125-43 of apparatus 200(t1) is set such that only light modulating elements 125-12, 125-22, 125-32 and 125-42 disposed in a central row of spatial light modulator 120 are in the "on" modulated state, whereby modulated light portions 118B-12, 118B-22, 118B-32 and 118B-42 are passed to anamorphic optical element 130, which in turn generates a scan line image SL(t1) in which a horizontal (white) scan feature SF(t1) is disposed in a central portion of elongated imaging region 167. In contrast, referring to the lower portion of FIG. 1, the on/off modulated state pattern of apparatus 200(t2) is set such that light modulating elements 125-11, 125-21, 125-31 and 125-41 disposed in the upper row of spatial light modulator 120 are in the "on" modulated state (all others are "off"), thereby generating scan line image (t2) in which horizontal scan feature SF(t2) is shifted upward by an incremental amount Y1 such that it is disposed along the upper edge of elongated imaging region 167.

In accordance with the present invention, the cross-scan (process) direction movement of an imaging surface 162 is synchronized with the modulation of a two-dimensional homogenous light field 119A such that image features of the scan line image SL scroll (raster) in the cross-scan direction at the same rate as the cross-scan movement of the imaging surface 162. Referring to upper left portion of FIG. 1, in one embodiment, this image/surface synchronization is achieved using an image position controller circuit 180. One function of image position controller circuit 180 is generate and transmit image data bit values 182 to spatial light modulator 120, whereby the on/off modulated states of light modulating elements 125-11 to 125-43 are controlled in accordance with scan line image data ID. An optional function of image position controller circuit 180 is to control the rotation rate of drum cylinder-type imaging structure 160 by way of control signal 184, although this function may be omitted when the rotation rate of imaging structure 160 is preset (constant) or is otherwise provided to image position controller circuit 180. The main function of image position controller circuit 180 is to periodically update the image data bit values 182 in synchronization with the cross-scan (e.g., upward) movement of the imaging surface 162 such that the on/off modulated states of light modulating elements 125-11 to 125-43 produce image features that scroll in the cross-scan direction (i.e., move upward) at the same rate as the cross-scan movement of the imaging surface 162, whereby the image features of scan line image SL remain coincident with associated portions of imaging surface 162 as the associated portions move in the process direction through elongated imaging region 167. Referring to the exemplary embodiment shown in FIG. 1, at first time t1, image position controller circuit 180 generates image data bit values 182 that cause light modulating elements 125-1 to 125-43 to produce horizontal scan feature SF(t1) in the central portion of elongated imaging region 167 when imaging surface 162 is in a first rotated position, and image position controller circuit 180 generates image data bit values 182 at time t2 that cause light modulating elements 125-11 to 125-43 to produce horizontal scan feature SF(t2) in the upper portion of elongated imaging region 167 when imaging surface 162 is displaced upward by the same incremental amount Y1 as that of horizontal scan feature SF(t2).

The purpose and benefits of the present invention are described in further detail below with reference to certain specific embodiments.

Figure 2:
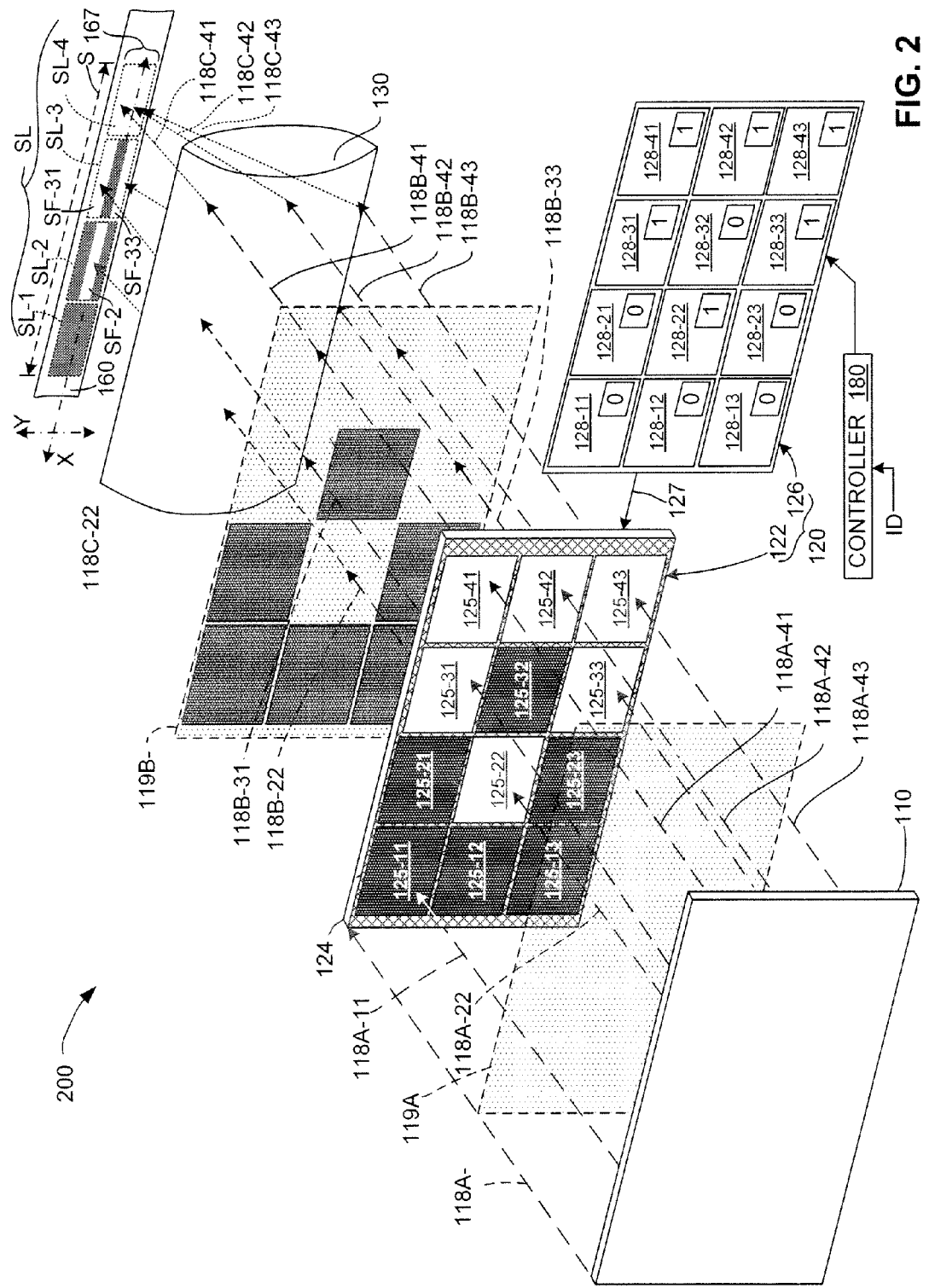
FIG. 2 is a top side perspective view showing an imaging apparatus utilized in accordance with an embodiment of the present invention.

FIG. 2 is a top side perspective view showing imaging apparatus 200 in additional detail, imaging apparatus 200 is utilized in accordance with an embodiment of the present invention.

Referring to the lower left portion of FIG. 2, in addition to the generalized elements mentioned above with reference to FIG. 1, imaging apparatus 200 also includes a homogenous light generator 110. Homogenous light generator 110 serves to generate continuous (i.e., constant/non-modulated) homogenous light 118A that forms substantially uniform two-dimensional homogenous light field 119A. That is, homogenous light generator 110 is formed such that all portions of homogenous light field 119A, which is depicted by the projected dotted rectangular box (i.e., homogenous light field 119A does not form a structure), receive light energy having substantially the same constant energy level. By utilizing the anamorphic optical system 130 to concentrate the modulated homogenous light, high total optical power (i.e., on the order of hundreds of Watts) can be selectively simultaneously generated on any point of scan line image SL without requiring a high power laser light source, thereby facilitating a cost-effective imaging apparatus that can be used, for example, for single-pass scanning and printing applications with high speed line addressing over 30 kHz. As set forth in additional detail below, homogenous light generator 110 is implemented using any of several technologies, and is therefore depicted in a generalized form in FIG. 2.

Referring to the lower left-center portion of FIG. 2, spatial light modulator 120 generally includes a modulating element array 122 made up of modulating elements 125-11 to 125-43 disposed on a support structure 124, and a device control circuit 126 including control (memory) cells 128-11 to 128-43 that store associated image data bit values (1 or 0) whose value is generated by controller 180 and determined by the predetermined scan image data ID. Modulating elements 125-11 to 125-43 are arranged in a two-dimensional array 122 and disposed such that a light modulating structure (e.g., a mirror, a diffractive element, or a thermo-optic absorber element) of each modulating element 125-11 to 125-43 receives a corresponding portion of homogenous light 118A (e.g., modulating elements 125-11 and 125-22 respectively receive homogenous light portions 118A-11 and 118A-22), and is positioned to selectively pass (modulate) the received corresponding modulated light portion along a predetermined direction toward anamorphic optical system 130 (e.g., modulating element 125-22 passes modulated light portion 118B-22 to anamorphic optical system 130, but modulating element 125-11 blocks or deflects light to keep it from reaching anamorphic optical system 130). Each light modulating element 125-11 to 125-43 is individually controllable by an associated control cell 128-11 to 128-43 by way of an associated control bit signal 127 to switch between an "on" (first) modulated state (e.g., when the associated control cell stores a "1" bit value) and an "off" (second) modulated state (e.g., when the associated control cell stores a "0" bit value). When a given modulating element is in the "on" modulated state, the modulating element is actuated to direct the given modulating element's associated received light portion toward anamorphic optic system 130. For example, in the simplified example, modulating element 125-43 is unshaded (white) to indicate it is rendered transparent in response to the "1" bit value stored in associated control cell 128-43 such that light portion 118A-43 passes through modulating element 125-43 toward anamorphic optic 130, whereby in the exemplary embodiment the passed light portion becomes "modulated" light portion 118B-43 that passes from modulating element 125-43 to a corresponding portion of anamorphic optic system 130. Conversely, when a given modulating element is in the "off" modulated state, the modulating element is actuated to prevent (e.g., block or redirect) the given modulating element's associated received light portion. For example, modulating element 125-11 is darkened to indicate it is rendered opaque in response to the "0" bit value stored in associated control cell 128-11, thereby preventing received light portion 118A-11 from being passed to anamorphic optical system 130. By selectively turning "on" or "off" modulating elements 125-11 to 125-43 in accordance with the bit values stored in control cells 128-11 to 128-43, spatial light modulator 120 serves to modulate (i.e., pass or not pass) portions of continuous homogenous light 118A such that a two-dimensional modulated light field 119B is generated that is passed to anamorphic optical system 130. As set forth in additional detail below, spatial light modulator 120 is implemented using any of several technologies, and is therefore not limited to the generalized "pass through" arrangement depicted in FIG. 2.

Referring to the center right portion of FIG. 2, anamorphic optical system 130 serves to anamorphically image and concentrate the modulated light portions, which are received from spatial light modulator 120 by way of two-dimensional light field 119B, onto an associated portion of imaging region 167 such that elongated scan line image SL is generated having a width S (i.e., measured in the X-axis direction indicated in FIG. 2). In particular, anamorphic optical system 130 includes one or more optical elements (e.g., lenses or mirrors) that are positioned to receive the two-dimensional pattern of light field 119B that are directed to anamorphic optical system 130 from spatial light modulator 120 (e.g., modulated light portion 118B-43 that is passed from modulating element 125-43), where the one or more optical elements (e.g., lenses or mirrors) are arranged to image and concentrate the received light portions to a greater degree along the cross-scan (e.g., Y-axis) direction than along the scan (X-axis) direction, whereby the received light portions are anamorphically focused to form an elongated scan line image SL that extends parallel to the scan (X-axis) direction. As set forth in additional detail below, anamorphic optical system 130 is implemented using any of several optical arrangements, and is therefore not limited to the generalized lens depicted in FIGS. 1 and 2.

According to an aspect of the present invention, light modulating elements 125-11 to 125-43 of spatial light modulator 120 are disposed in a two-dimensional array 122 of rows and columns, and anamorphic optical system 130 is arranged to image and concentrate light portions passed through each column of modulating elements on to each scan line portion SL-1 to SL-4 of scan line image SL. As used herein, each "column" includes the illuminated light modulating elements arranged in a direction that is substantially perpendicular to scan line image SL (e.g., light modulating elements 125-11, 125-12 and 125-13 are disposed in the leftmost column of array 122), and each "row" includes light modulating elements arranged in a direction substantially parallel to scan line image SL (e.g., light modulating elements 125-11, 125-21, 125-31 and 125-41 are disposed in the uppermost row of array 122). In the simplified arrangement shown in FIG. 2, any light passed through elements 125-11, 125-12 and 125-13 is imaged and concentrated by anamorphic optical system 130 onto scan line portion SL-1, any light passed through elements 125-21, 125-22 and 125-23 is imaged and concentrated onto scan line portion SL-2, any light passed through elements 125-31, 125-32 and 125-33 is imaged and concentrated onto scan line portion SL-3, and any light passed through elements 125-41, 125-42 and 125-43 is imaged and concentrated onto scan line portion SL-4.

According to another aspect of the present invention, scan structure 160 is positioned such that the cross-scan (Y-axis) position of features formed in scan line portions SL-1 to SL-4 can be altered depending on which modulating elements in each column are in the "on" modulated state. In the example shown in FIG. 2, element 125-22 is located in the center position of its associated column, so the corresponding "white" scan feature SF-2 is generated in a central portion of scan line portion SL-2. Because elements 125-131 and 125-133 are respectively located in the upper and lower positions of its associated column, the corresponding "white" scan features SF-31 and SF-32 are formed in corresponding upper and lower portions of scan line portion SL-3.

Note that the simplified spatial light modulator 120 shown in FIG. 2 includes only three modulating elements in each column for descriptive purposes, and those skilled in the art will recognize that increasing the number of modulating elements disposed in each column of array 122 would enhance gray scale control by facilitating the production of spots exhibiting additional shades of gray. A large number of modulating elements in each column of array 122 also facilitates the simultaneous generation of two or more scan lines within a narrow swath, and also allows for scrolling of image data to prevent blurring as set forth in additional detail below. Yet another benefit to providing a large number of light modulating elements in each column is that this arrangement would allows for one or more "reserve" or "redundant" elements that are only activated when one or more of the regularly used elements malfunctions, thereby extending the operating life of the imaging system.

Figure 3A:
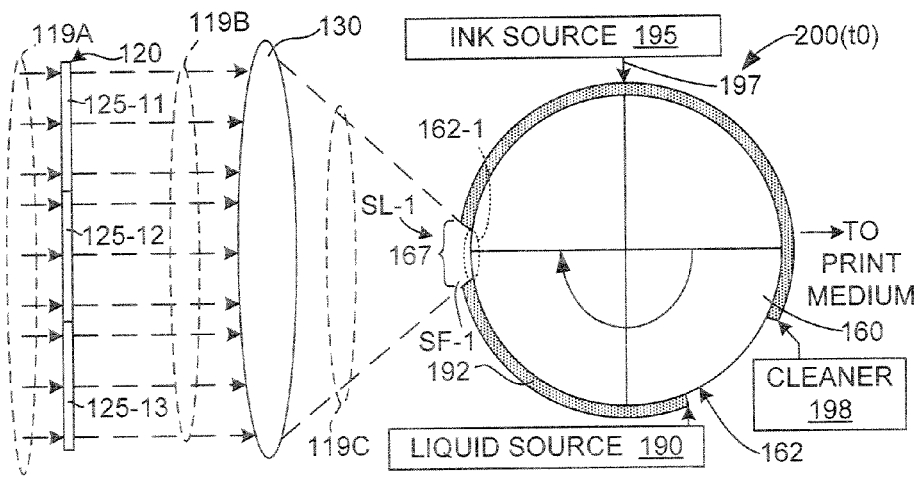
FIGS. 3(A), 3(B) and 3(C) are simplified side views showing the apparatus of FIG. 2 during a single-frame scan operation using a high powered light source.
Figure 3B:
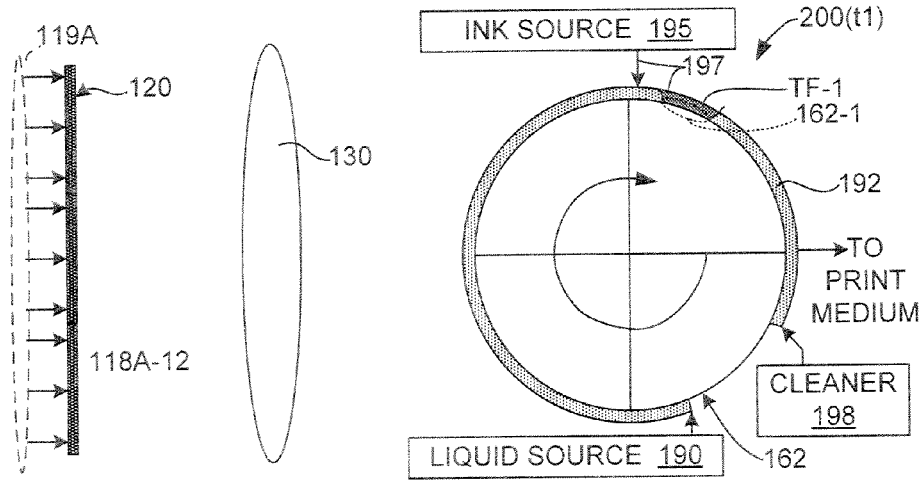
Figure 3C:
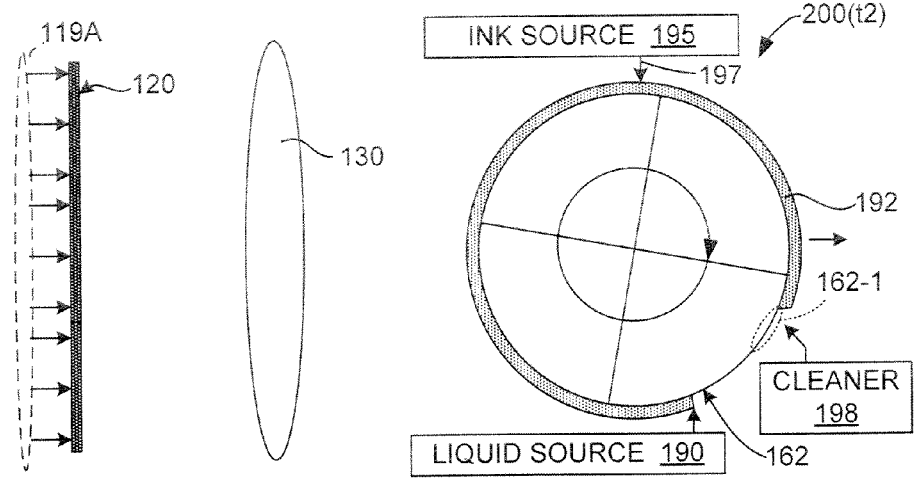

FIGS. 3(A) to 3(C) show an idealized imaging apparatus 200 in additional detail according to a specific embodiment of the present invention in which apparatus 200 serves as a printer or scanner that utilizes a novel image transfer operation in which a fountain solution is selectively removed by the anamorphically imaged and concentrated light prior to the application of an ink, which is then transferred to a print medium (e.g., a sheet of paper). The illustrated arrangement shown in FIGS. 3(A) to 3(C) is intended to generally describe the image transfer operation, and those skilled in the art will recognize that the basic concept of the image transfer operation may be implemented using arrangements other than those described herein. Those skilled in the art will recognize that the phrase "fountain solution" refers to a dampening (e.g., water, Novec™ manufactured by 3M of St. Paul, Minn., USA, etc.) solution used in lithography to keep non-image areas of smooth imaging surface (e.g., a plate or roller surface) from holding ink.

Referring to FIG. 3(A), to implement the image transfer operation, imaging apparatus 200 further includes a liquid source 190 that applies a fountain solution 192 onto imaging surface 162 at a point upstream of elongated imaging region 167, an ink source 195 that applies an ink material 197 at a point downstream of elongated imaging region 167, a transfer mechanism (not shown) for transferring the ink material 197 to a target print medium, and a cleaning mechanism 198 that prepares imaging surface 162 for the next exposure cycle. Ink source 195 applies ink material 197 onto exposed portions of imaging surface 162 (i.e., when fountain solution 192 is removed to expose such portions). According to the image transfer operation, only ink material disposed on imaging surface 162 is transferred to the print medium. Thus, variable data from fountain solution removal is transferred, instead of constant data from a plate as in conventional systems. For this process to work using a rastered light source (i.e., a light source that is rastered back and forth across the scanline), a single very high power light (e.g., laser) source would be required to sufficiently remove the fountain solution in real time. A benefit of this arrangement is that, because liquid from an ink donor roller is removed from the entire scan line simultaneously, an offset press configuration is provided at high speed using multiple relatively low power light sources.

FIGS. 3(A) to 3(C) illustrate an idealized image transfer operation of imaging apparatus 200 in that these figures shown the substantially instantaneously and complete removal of fountain solution 192 when exposed to the imaged and concentrated light. FIG. 3(A) shows imaging apparatus 200 at an initial time t0, FIG. 3(B) shows imaging apparatus 200 at a subsequent time t1, and FIG. 3(C) shows imaging apparatus 200 at a further subsequent time t2.

Referring to FIG. 3(A), at time t0 all three light modulating elements 125-11, 125-12 and 125-13 of spatial light modulator 120 are caused to enter the "on" modulated state, whereby the portion of homogenous light field 119A received by these elements is passed into modulated light field 119B and imaged and concentrated by anamorphic optical system 130 such that the imaged and concentrated light field 119C applies light onto the portion of elongated imaging region 167 corresponding to scan line portion SL-1 (see FIG. 2). In the idealized embodiment, the anamorphically concentrated modulated light field 119C substantially instantaneously and completely removes the fountain solution disposed over surface region 162-1, thereby forming surface feature SF-1 that exposes imaging surface region 162-1. Note that, prior to time to, all three modulating elements 125-11, 125-12 and 125-13 of spatial light modulator 120 were maintained in the "off" modulated state such that all portions of imaging surface located downstream of surface region 162-1 remain covered with fountain solution 192 that repels or rejects ink material 197.

FIGS. 3(B) and 3(C) show how surface feature SF-1 is subsequently utilized in accordance with the image transfer operation of imaging apparatus 200. Referring to FIG. 3(B), at time t1 drum cylinder 160 has rotated such that surface region 162-1 has passed under ink source 195. Due to the removal of fountain solution depicted in FIG. 3(A), ink material 197 is disposed on exposed surface region 162-1 to form an ink feature TF-1. As ink feature TF-1 passes the transfer point, ink feature TF-1 is transferred to the print medium, resulting in a "dot" of ink printed on the print medium. Subsequently, as indicated in FIG. 3(C), the surface region 162-1 with ink feature TF-1 now substantially removed is rotated under cleaning mechanism 198, which removes any residual ink and fountain solution material to prepare surface region 162-1 for a subsequent exposure/print cycle.

A potential problem with the idealized operation described above with reference to FIGS. 3(A) to 3(C) is that instantaneous removal of fountain solution 192 from selected portions of imaging surface 152 may be difficult to achieve, which requires that concentrated light field 119C be applied and maintained for a sufficiently long period of time to complete the removal process. If the frame time (i.e., the time period during which the modulating elements remain "on") needed to fully remove the fountain solution is significant, then imaging surface 162 may move a significant amount in the process direction during each frame, which can result in smearing of the transferred image. This potential problem is illustrated in FIGS. 4(A) to 4(C), where FIG. 4(A) shows imaging apparatus 200 at an initial time t31 when light modulating element 125-12 of spatial light modulator 120 is toggled into the "on" modulated state (all others remain "off"), whereby a relatively small portion of homogenous light field 119A received by element 125-12 is passed into modulated light field 119B and imaged and concentrated by anamorphic optical system 130 such that imaged and concentrated light field 119C applies light onto the portion of elongated imaging region 167 corresponding to scan line portion SL-1, thereby applying concentrated light onto the fountain solution disposed over surface region 162-31. In accordance with this exemplary embodiment, the power of anamorphically imaged and concentrated modulated light field 119C is insufficient to instantaneously remove the fountain solution over surface region 162-31 so that surface region 162-31 remains at least partially covered with fountain solution. As indicated in FIG. 4(B), which occurs at a time t32 after time t31 but before the end of the current "frame", light modulating element 125-12 remains in the "on" modulated state, and imaged and concentrated light field 119C continues to apply light onto the portion of elongated imaging region 167 corresponding to scan line portion SL-1. However, due to the rotation of drum cylinder 160 during the period between time t31 and time t32, the imaged and concentrated light associated with the current "frame" continues to remove fountain solution over an extended surface region 162-32 such that central portions of extended surface region 162-32 receive light during the entire frame, but edge portions of extended surface region 162-32 only briefly receive light at the beginning and end of the frame, whereby fountain solution removal in the edge regions is incomplete (indicated by the curved edges of resulting surface feature SF-3). As illustrated in FIG. 4(C), at a subsequent time t4 when surface feature SF-3 passes under ink source 195 and applied ink material 197 is applied, ink feature TF-3 is characterized by being too narrow and/or having edge regions that may or may not transfer to the print medium, resulting in undesirable smearing or other deformation of the ink (transfer) material, resulting in a non-optimal image transfer operation. To avoid the smearing problem described above with reference to FIGS. 4(A) to 4(C), according to an aspect of the present invention, image position controller 180 is utilized to synchronize the cross-scan (process direction) movement of imaging surface 162 with the modulated states of light modulating elements 125-11 to 125-13, for example, by causing the image data bit values to shift (raster) through the light modulating elements 125-11 to 125-13, such that the generated image features are scrolled (moved in the cross-scan direction) at the same rate as the cross-scan movement of imaging surface 162, whereby the features remain coincident with the same portion (region) of the imaging surface 162 even though that image surface portion has moved in the process direction. That is, a key aspect of the present invention lies in understanding that the imaged and concentrated light field 119C is delivered by anamorphic optical system 130 to imaging surface 162 while imaging surface 162 is minutely shifted in the process direction. By individually controlling the multiple modulating elements disposed in each column such that image data bits are shifted upward (or downward) along the column, the present invention provides an imaging apparatus that avoids the smearing issue.

Figure 5A:
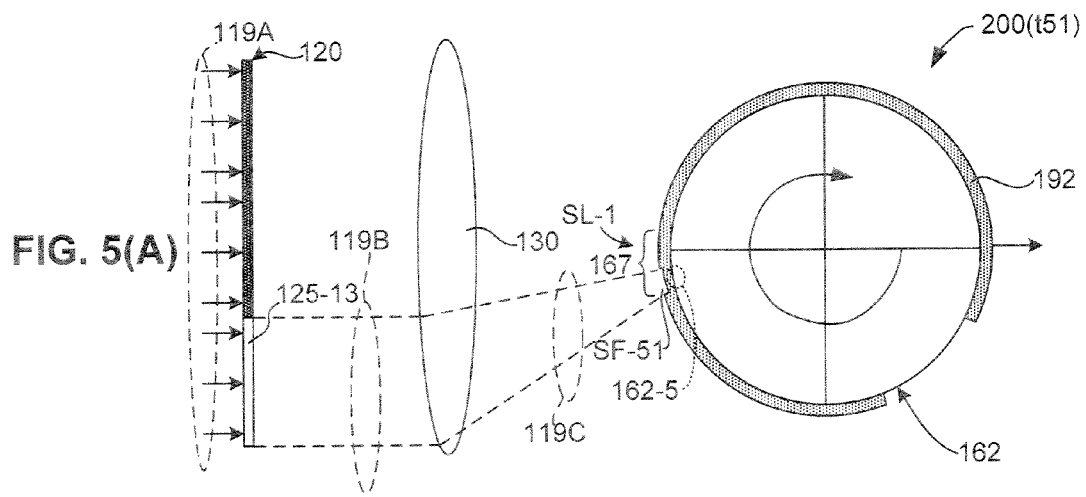
FIGS. 5(A), 5(B) and 5(C) are simplified side views showing the apparatus of FIG. 2 during a synchronized scan operation according to the present invention.
Figure 5B:
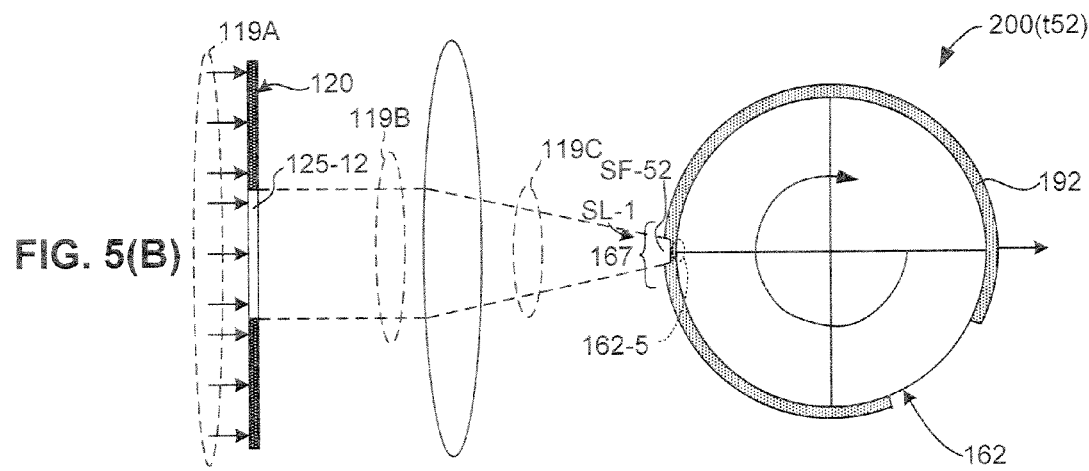
Figure 5C:
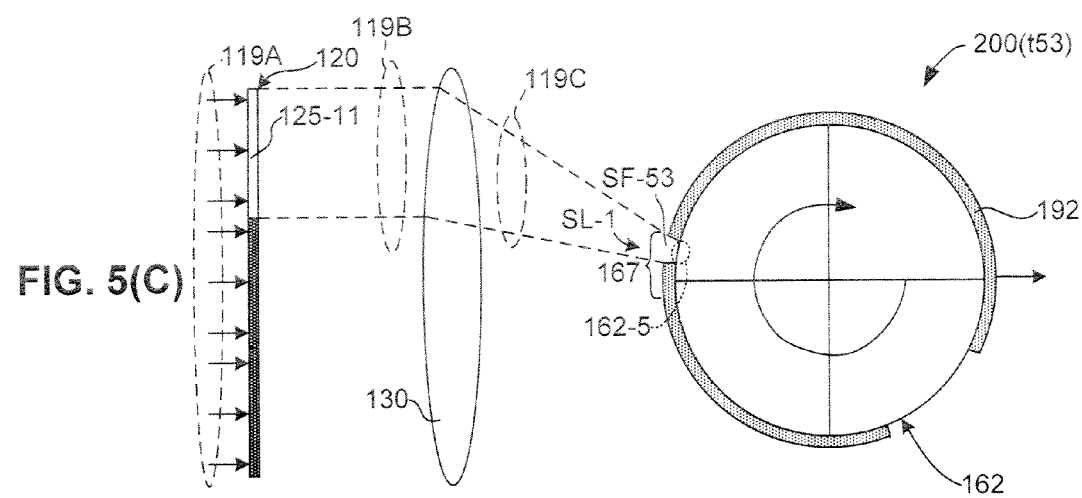
Figure 6A:
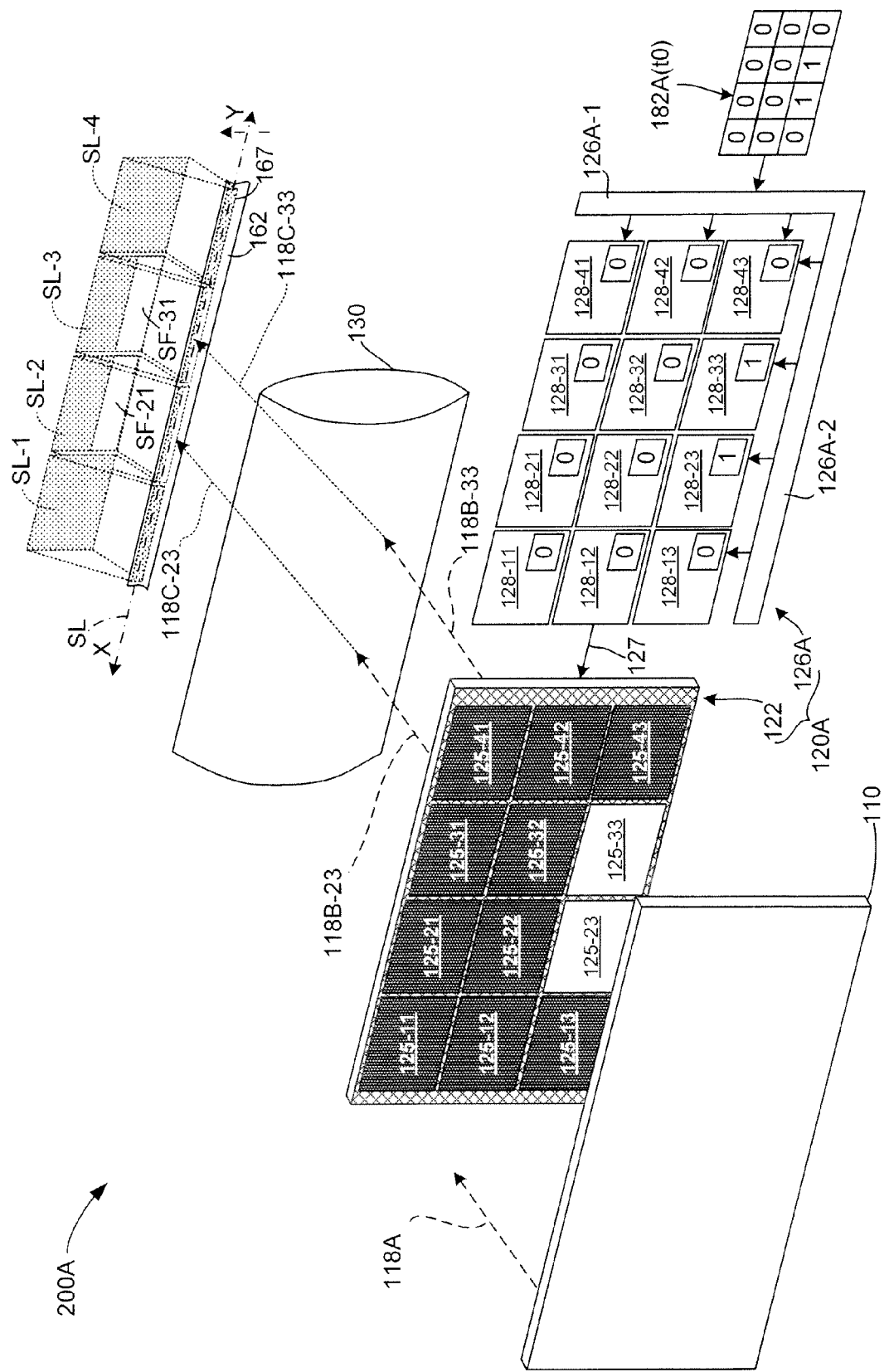
Figure 6B:
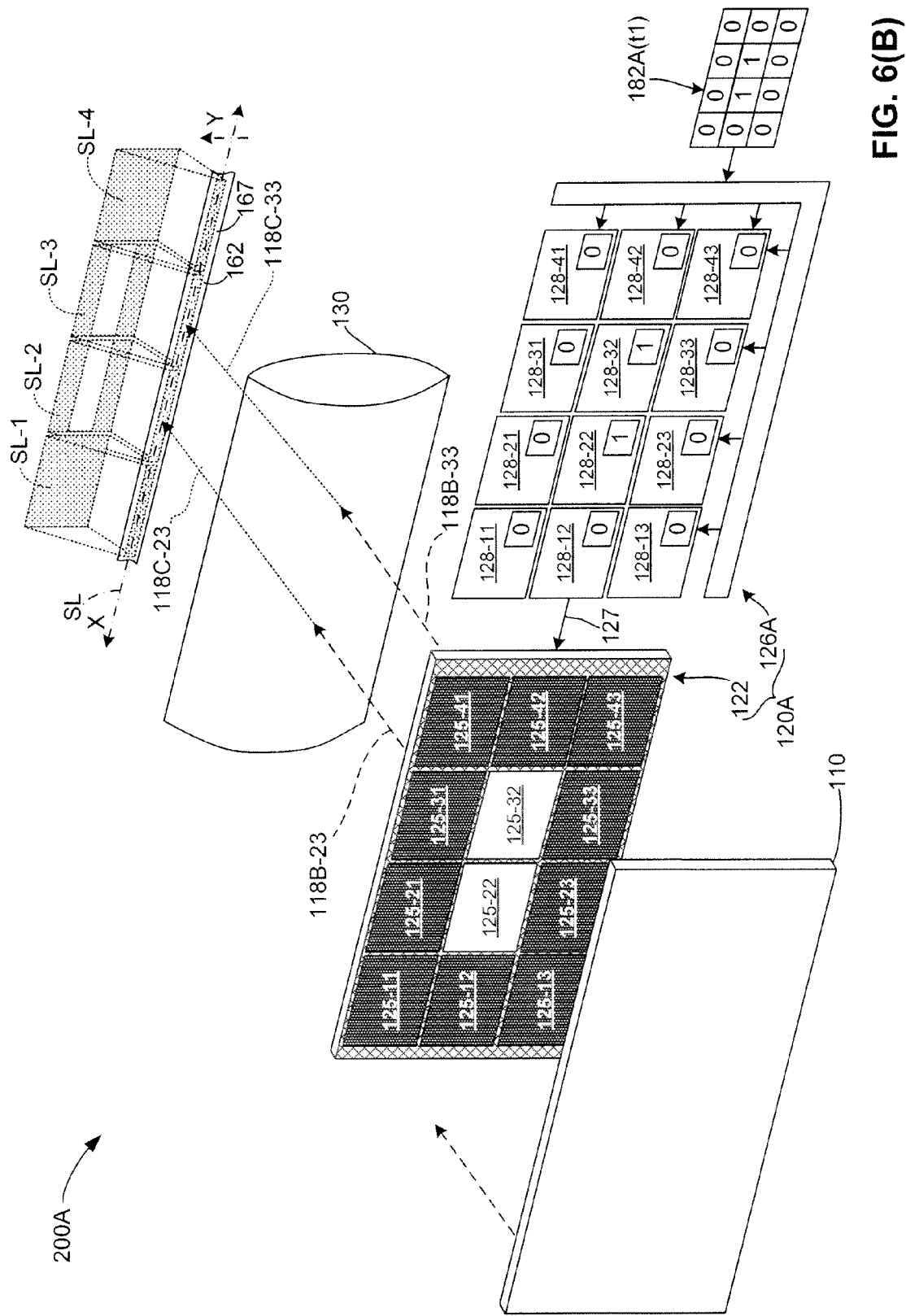
Figure 7A:
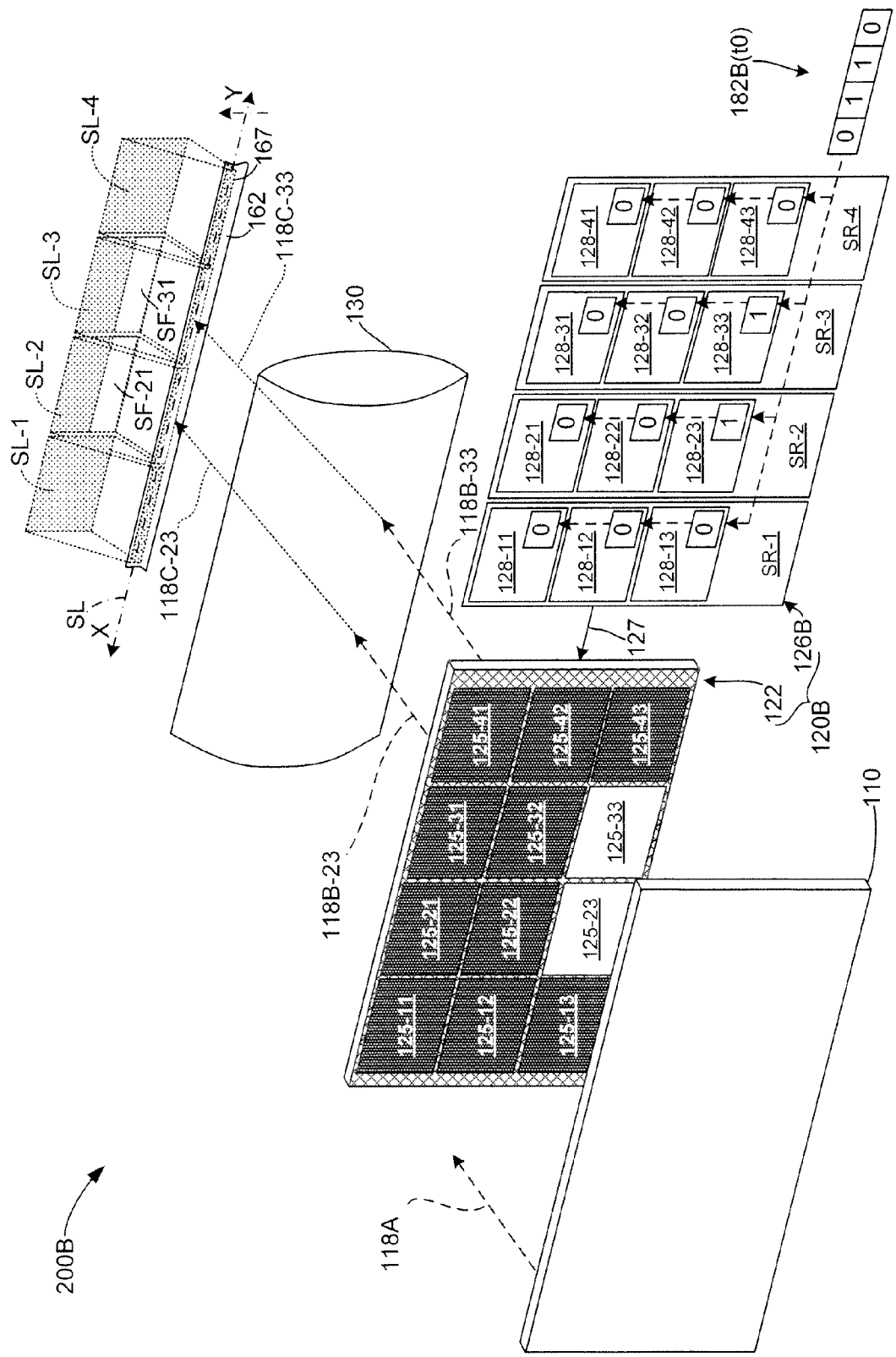
Figure 7C:
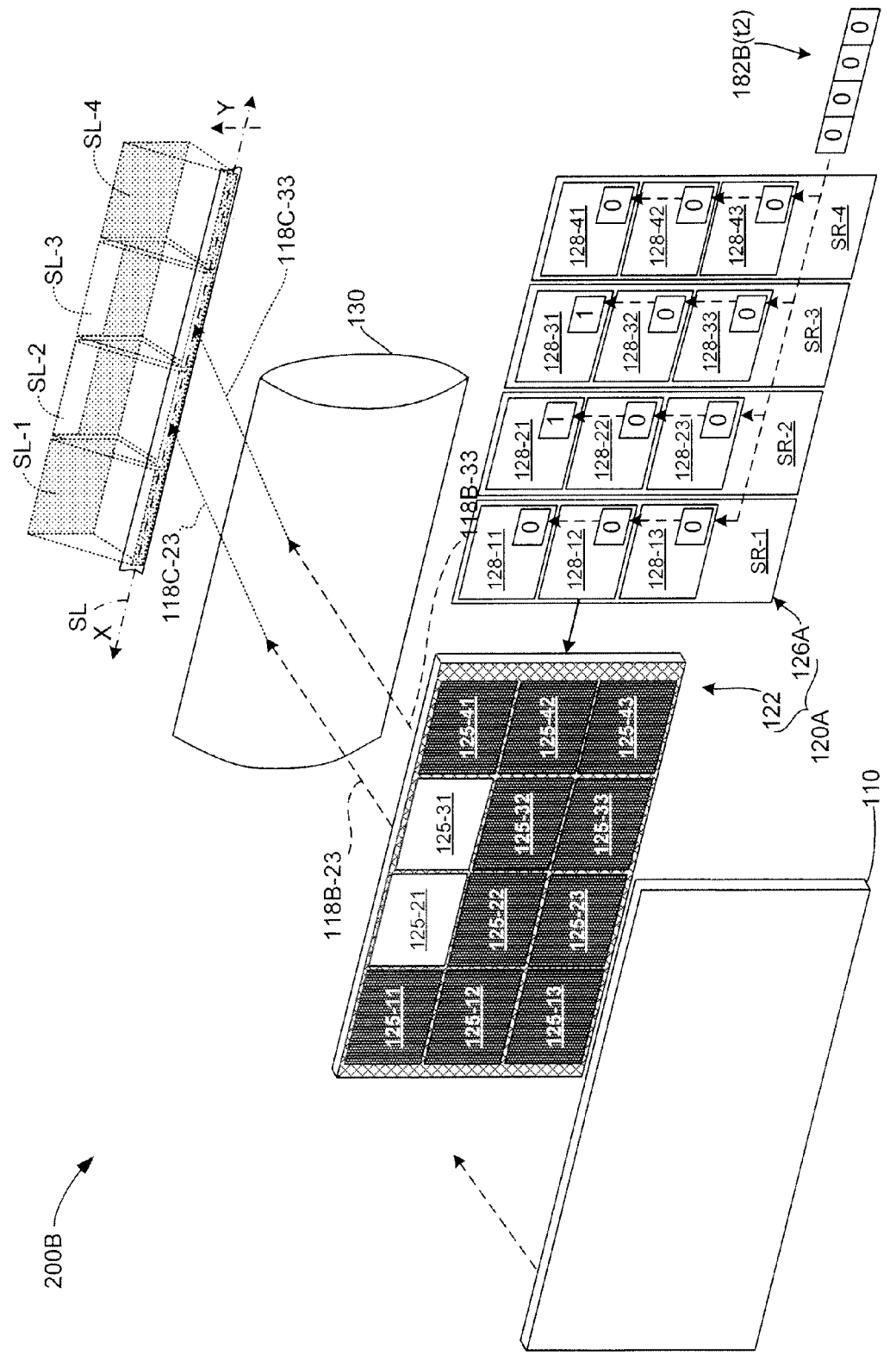

FIGS. 5(A) to 5(C) illustrate the synchronization of imaging surface 162 with the modulated states of light modulating elements 125-11 to 125-13 according to an exemplary embodiment in order to avoid the smearing problem described above with reference to FIGS. 4(A) to 4(C). FIG. 5(A) shows imaging apparatus 200 at an initial time t51 when light modulating element 125-13 of spatial light modulator 120 is toggled into the "on" modulated state (all others remain "off"), whereby a relatively small portion of homogenous light field 119A received by element 125-13 is passed into modulated light field 119B and concentrated by anamorphic optical system 130 such that concentrated light field 119C applies light onto a lower portion of scan line portion SL-1 in elongated imaging region 167, thereby applying imaged and concentrated light onto the fountain solution disposed over surface region 162-5. In accordance with this exemplary embodiment, the power of anamorphically imaged and concentrated modulated light field 119C is insufficient to instantaneously remove the fountain solution over surface region 162-5, thereby generating a partially formed surface feature SF-51 in which surface region 162-5 remains at least partially covered with fountain solution. As indicated in FIG. 5(B), which shows apparatus 200 at a sub-frame time t52 immediately after time t51, light modulating element 125-13 is toggled "off" and light modulating element 125-12 is toggled "on", whereby imaged and concentrated light field 119C now applies light onto a central portion of elongated imaging region 167 in scan line portion SL-1. Note that, due to the rotation of drum cylinder 160 during the period between time t51 and time t52, surface region 162-5 has also rotated into the central portion of elongated imaging region 167 such that concentrated light field 119C at time t52 continues to remove fountain solution over surface region 162-5 to produce a further developed surface feature SF-52. Similarly, as illustrated in FIG. 5(C), which shows apparatus 200 at a sub-frame time t53 immediately after time t52, light modulating element 125-12 is toggled "off" and light modulating element 125-11 is toggled "on", whereby concentrated light field 119C now applies light onto an upper portion of elongated imaging region 167 in scan line portion SL-1, where further rotation of drum cylinder 160 during the period between time t52 and time t53 has again aligned concentrated light field 119C with surface region 162-5, thereby providing a fully developed surface feature SF-53 over surface region 162-5. Fully developed scan feature SF-53 is then processed as described above with reference to FIGS. 3(B) and 3(C). As depicted in these figures, by rastering the image data associate with scan image feature SF-53, ink deposition is subsequently performed as described above on precisely defined region 162-5, thereby avoiding the smearing problems described above. That is, the present invention avoids the smearing problem by microstepping the rasters in the spatial light modulator (e.g., a DMD device) in synchronicity with the process velocity of drum cylinder 160, thus causing the applied concentrated light to appear stationary on imaging surface 162. The ability to raster the concentrated light in sub-scan increments (in the inverse process direction) to exactly match the speed of the process as imaged is possible due to the use spatial light modulator 120 having individually controlled light modulating elements 125-11 to 125-43 disposed in an array, and anamorphically imaging and concentrating the modulated light in the manner described above. Further, in addition to avoiding the smearing problem, by rastering scan image feature SF-5x in synchronization with movement of imaging surface 162, the present invention also increases the exposure time associated with each image feature on the imaging surface. FIGS. 6(A) to 6(C) and FIGS. 7(A) to 7(C) are partial perspective views respectively showing imaging apparatus 200A and 200B including spatial light modulators 120A and 120B according to alternative specific embodiments of the present invention, and illustrate alternative approaches for synchronizing the cross-scan movement of imaging surface 162 with the modulated states of light modulating elements 125-11 to 125-43. In particular, FIGS. 6(A) to 6(C) illustrate a first process approach utilizing a spatial light modulator 120A that accesses control cells 128-11 to 128-43 using a standard random access memory technique, and FIGS. 7(A) to 7(C) illustrate a second process approach utilizing a spatial light modulator 120B in which control cells 128-11 to 128-43 are accessed using a novel shift register arrangement. As set forth below, these control cell arrangements utilize different data transfer approaches to generate the desired synchronized modulation of light modulating elements 125-11 to 125-43. Referring to FIG. 6(A), in a manner similar to that described above, homogenous light 118A generated by homogenous light source 110 is modulated by light modulating elements 125-11 to 125-43 of spatial light modulator 120A and anamorphically concentrated by optical system 130 to generate scan line image SL in elongated imaging region 167 on imaging surface 162. Note that the dashed lined boxes depicted behind imaging surface 162 show elongated imaging region 167 in an enlarged fashion for illustrative purposes. Similar to previously described embodiments, spatial light modulator 120A includes light modulating elements 125-11 to 125-43 arranged in rows and columns that form an array 122, and also includes corresponding control cells 128-11 to 128-43 that respectively control the on/off modulated state of light modulating elements 125-11 to 125-43 according to stored image data bits. In the present specific embodiment, spatial light modulator 120A is characterized by including a controller 126A made up of a row address portion 126A-1 and a column address portion 126A-2 that facilitate individual addressing of control cells 128-11 to 128-43 according to known random access memory techniques (i.e., such that data bits are written by addressing each individual control cell 128-11 to 128-43).

In accordance with a first aspect of the present embodiment, image data is written to spatial light modulator 120A from the image position controller (i.e., controller 180, see FIGS. 1 and 2) as a series of data frames 182A, where each data frame 182A includes one image data bit ("1" or "0") for every control cell 128-11 to 128-43, whereby all light modulating elements 125-11 to 125-43 of array 122 are controlled by one data bit of each data frame 182A. For example, FIG. 6(A) shows data frame 182A(t0) transmitted to control cells 128-11 to 128-43 by way of controller 126A at an initial time to, and after the image data are written to control cells 128-11 to 128-43. The image data thus stored in control cells 128-11 to 128-43 causes light modulating elements 125-11 to 125-43 to enter a first modulated state by way of control bit signals 127, whereby, as shown in FIG. 6(A), light modulating elements 125-23 and 125-33 are switched to the "on" modulated state and all other elements are switched "off". The resulting modulation pattern passes modulated light portions 118B-23 and 118B-33 to optical system 130, which produces concentrated modulated light portions 118C-23 and 118C-33 that are directed onto elongated imaging region 167 such that scan features SF-21 and SF-31 are formed in the lower portions of scan line portions SL-2 and SL-3, respectively. Similarly, FIG. 6(B) shows data frame 182A(t1) transmitted at a subsequent time t1 after a corresponding sub-scan time interval, where the associated image data stored in control cells 128-11 to 128-43 toggles light modulating elements 125-22 and 125-32 into the "on" modulated state (modulating elements 125-23 and 125-33 are switched "off"). The resulting modulation pattern at time t1 passes modulated light portions 118B-22 and 118B-32 to optical system 130, which produces concentrated modulated light portions 118C-22 and 118C-32 that form scan features SF-22 and SF-32 in the central portions of scan line portions SL-2 and SL-3, respectively. FIG. 6(C) shows data frame 182A(t2) transmitted at time t2 after an additional sub-scan time interval, where the associated image data stored in stored control cells 128-11 to 128-43 toggles light modulating elements 125-22 and 125-32 into the "on"

modulated state (modulating elements 125-21 and 125-31 are switched "off"). The resulting modulation pattern at time t2 passes modulated light portions 118B-21 and 118B-31 to optical system 130, which produces concentrated modulated light portions 118C-21 and 118C-31 that form scan features SF-23 and SF-33 in the upper portions of scan line portions SL-2 and SL-3, respectively. By adjusting the sub-scan timing associated with the pattern of modulated states shown in FIGS. 6(A) to 6(C) to match the cross-scan movement of the imaging surface 162 in the Y-axis direction, the desired synchronization described above with reference to FIGS. 5(A)-5(C) is achieved.

According to another aspect of the present embodiment, image data shifting is accomplished by modifying the image data of each sequential data frames 182A by shifting (re-ordering) some of the data bit values of the previous data frame and incorporating into the modified data frame a new set of data bit values, e.g., corresponding to a lowermost or uppermost row of modulating elements 125-11 and 125-43. For example, data frame 182A(t0) shown in FIG. 6(A) is generated by the image position controller to include "0" bit values except for those written to control cells 128-23 and 128-33 (i.e., the two "1" data values included in the lowermost row of frame 182A(t0), which is depicted in a graphic form solely for descriptive purposes), thereby generating the modulated state shown in FIG. 6(A) where light modulating elements 125-23 and 125-33 are "on". The image position controller then generates subsequent data frame 182A(t1) (see FIG. 6(B)) by effectively shifting the lower two rows of frame 182A(t0) upward, and writing "0" bit values in the lowermost row, thus generating the desired modulated state shown in FIG. 6(B) in which light modulating elements 125-22 and 125-32 are "on". Finally, the image position controller then generates subsequent data frame 182A(t2) (see FIG. 6(C)) by effectively shifting the lower two rows of frame 182A(t1) upward, and writing "0" bit values in the lowermost row, thus generating the desired modulated state shown in FIG. 6(C) in which light modulating elements 125-21 and 125-31 are "on". Although the process described with reference to FIGS. 6(A) to 6(C) is suitable for use in existing spatial light modulators in which control cells can only be accessed by random access techniques, this process requires writing similar data multiple times as the data rasters up the spatial light modulator, and requires very high data transmission rates. FIGS. 7(A) to 7(C) illustrate a second process that avoids the high data transmission rate requirements of the previous approach by utilizing a spatial light modulator in which the control cells are incorporated into one or more shift register circuits. Referring to FIG. 7(A), imaging apparatus 200B includes a homogenous light source 110 for generating homogenous light 118A in a manner similar to that described above, spatial light modulator 120B includes an array 122 of light modulating elements 125-11 to 125-43 controlled by control cells 128-11 to 128-43 in a manner similar to that described above, and modulated light is anamorphically concentrated by optical system 130 to generate scan line image SL in elongated imaging region 167 on imaging surface 162 in a manner similar to that described above. In accordance with an aspect of the present specific embodiment, spatial light modulator 120B includes a controller 126B made up of shift register circuit SR-1 to SR-4 arranged such that each column of control cells 128-11 to 128-43 is part of a corresponding shift register circuit SR-1 to SR-4 (i.e., control cells 128-11 to 128-13 are part of shift register circuit SR-1, control cells 128-21 to 128-23 are part of shift register circuit SR-2, control cells 128-31 to 128-33 are part of shift register circuit SR-3, and control cells 128-41 to 128-43 are part of shift register circuit SR-4). As indicated by the arrows in FIGS. 7(A) to 7(C), each shift register circuit SR-1 to SR-4 is arranged according to known techniques such that one row of "new" data is written to the spatial light modulator during each sub-scan time interval, and all previously received data bits are shifted within shift register circuits SR-1 to SR-4 such that the shifted data controls an associated adjacent light modulating element in array 122. For example, when a "new" data bit is written to bottommost control cell 128-13, the data value previously stored in control cell 128-13 is shifted upward to control cell 128-12, and the data value previously stored in control cell 128-12 is shifted upward to control cell 128-11 (the data bit previously stored in control cell 128-11 is deleted). Similarly, a "new" data bit written to bottommost control cell 128-23 causes the previous data values to shift upward to control cells 128-22 and 128-21, a "new" data bit written to bottommost control cell 128-33 causes the previous data values to shift upward to control cells 128-32 and 128-31, and a "new" data bit written to bottommost control cell 128-43 causes the previous data values to shift upward to control cells 128-42 and 128-41. According to another aspect of the present embodiment, the shift register format of imaging apparatus 200B simplifies the process of rastering data between associated light modulating elements by requiring data bits for only one row of light modulating elements to be written during each sub-scan time period, thereby making implementation of the desired image scrolling operation more efficiently. For example, data frame 182B(t0) shown in FIG. 6(A) is generated by the image position controller to include only four bit values (two "0" bit values for control cells 128-13 and 128-43 and two "1" data values for control cells 128-23 and 128-33), thereby generating the modulated state shown in FIG. 7(A) where light modulating elements 125-23 and 125-33 are "on". The image position controller then generates subsequent data frame 182B(t1) (see FIG. 7(B)) that includes four "0" bit values written into light modulating elements 125-13, 125-23, 125-33 and 125-41, whereby the previously written "1" data values are shifted upward by shift registers SR-2 and SR-3 to control cells 128-22 and 128-32, thereby generating the modulated state shown in FIG. 7(B) where light modulating elements 125-22 and 125-32 are "on". Finally, the image position controller generates subsequent data frame 182B(t2) (see FIG. 7(C)) that includes four more "0" bit values written into light modulating elements 125-13, 125-23, 125-33 and 125-41, whereby the previously written "1" data values are shifted upward by shift registers SR-2 and SR-3 to control cells 128-21 and 128-31, thereby generating the modulated state shown in FIG. 7(C) where light modulating elements 125-21 and 125-31 are "on". With this arrangement, each sub-scan row of the array receives its rasterized data vector from its adjacent and preceding sub-scan row at each sub-scan time interval, the first sub-scan row being updated as necessary (and only once per raster) as each new data raster boundary is encountered. This shift register format approach greatly improves efficiency by dramatically reducing bandwidth requirements (e.g., by a factor of 1000 if there were 1000 rows of light modulating elements in the spatial light modulator). Various components of apparatus 200 that are generally described above will now be described in additional detail with reference to certain specific exemplary embodiments.

According to alternative embodiments of the present invention, the light source utilized to generate the high energy beam can be composed a single high power light generating element, or composed of multiple low power light generating elements that collectively produce the desired light energy. For high power homogenous light applications, the light source is preferably composed of multiple lower power light sources (e.g., edge emitting laser diodes or light emitting diodes) whose light emissions are mixed together by the homogenizer optics and produce the desired high power homogenous output. An additional benefit of using several independent light sources is that laser speckle due to coherent interference is reduced.

Figure 8A:
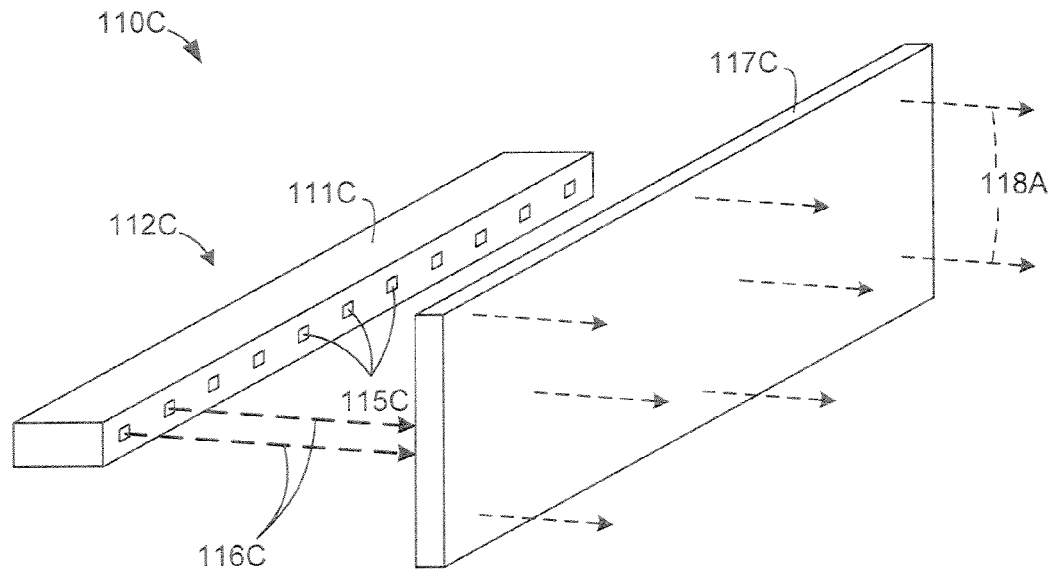
FIGS. 8(A) and 8(B) are simplified perspective views showing alternative light sources utilized by the homogenous light generator of the imaging system of FIG. 2 according to alternative embodiments of the present invention.

FIG. 8(A) illustrates a light source 112C according to a specific embodiment in which multiple edge emitting laser diodes 115C are arranged along a straight line that is disposed parallel to the rows of light modulating elements (not shown). In alternative specific embodiments, light source 112C consists of an edge emitting laser diode bar or multiple diode bars stacked together. These sources do not need to be single mode and could consist of many multimode lasers. Optionally, a fast-axis collimation (FAC) microlens could be used to help collimate the output light from an edge emitting laser.

Figure 8B:
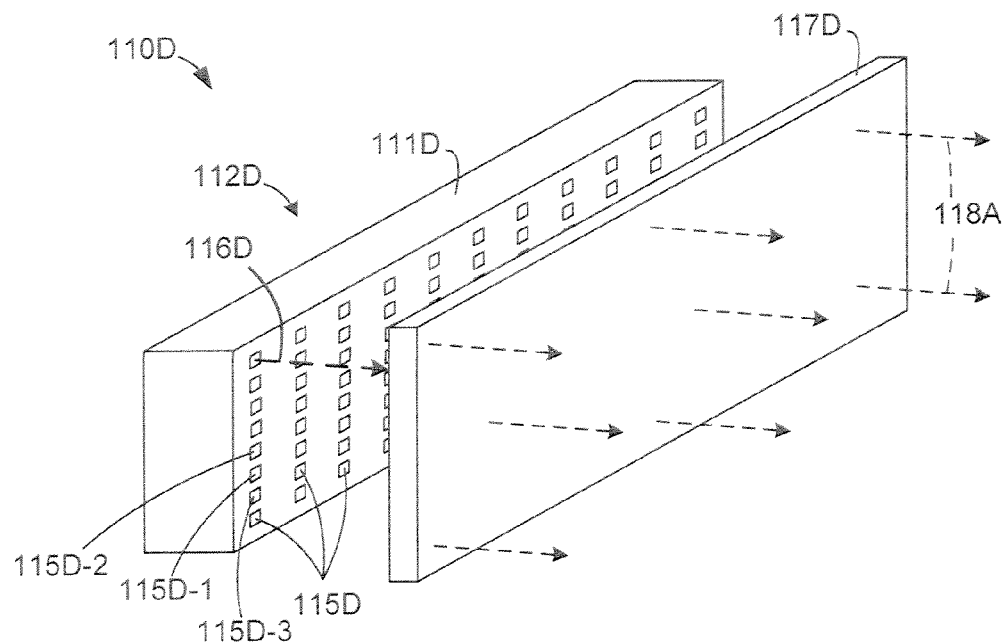

FIG. 8(B) illustrates a light source 112C according to another specific embodiment in which multiple vertical cavity surface emitting lasers (VCSELs) 115D are arranged in a two-dimensional array on a carrier 111D. This two-dimensional array of VCSELS could be stacked in any arrangement such as hexagonal closed packed configurations to maximize the amount of power per unit area. Ideally such laser sources would have high plug efficiencies (e.g., greater than 50%) so that passive water cooling or forced air flow could be used to easily take away excess heat.

According to alternative embodiments of the present invention, light homogenizer 117C/D (which is shown in generalized form in FIGS. 8(A) and 8(B)) is implemented using one or more tapered light pipes, a microlens array, or any of several different additional technologies and methods known in the art.

Figure 9A:
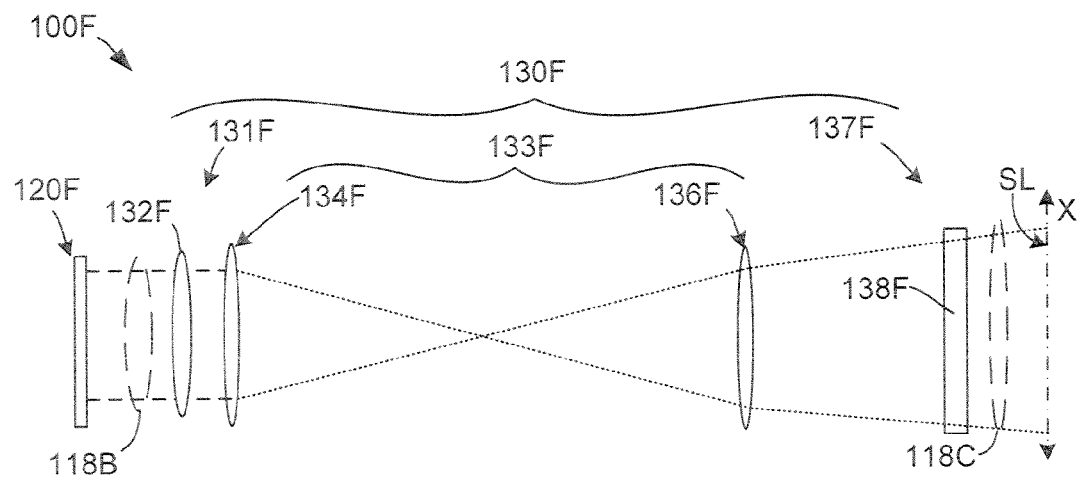
FIGS. 9(A) and 9(B) are simplified top and side views, respectively, showing an anamorphic optical system utilized by imaging apparatus of FIG. 2 according to a specific embodiment of the present invention.
Figure 9B:
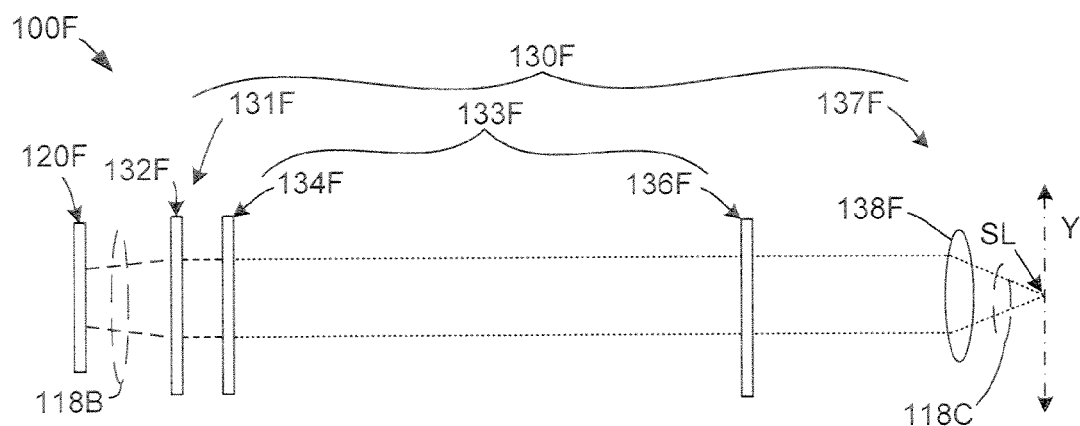

FIGS. 9(A) and 9(B) are simplified diagrams showing a portion of an imaging apparatus 200F including a generalized anamorphic optical system 130F according to an exemplary embodiment of the present invention. Referring to FIG. 9(A), anamorphic optical system 130F includes a collimating optical subsystem 131F, a cross-process optical subsystem 133F, and process-direction optical subsystem 137F according to an exemplary specific embodiment of the present invention. As indicated by the ray traces in FIGS. 9(A) and 9(B), optical subsystems 131F, 133F and 137F are disposed in the optical path between spatial light modulator 120F and scan line SL, which is generated at the output of imaging system 100F. FIG. 9(A) is a top view indicating that collimating optical subsystem 131F and cross-process optical subsystem 133F act on the modulated light portions 118B passed by spatial light modulator 120F to form concentrated light portions 118O on scan line SL parallel to the X-axis (i.e., in the cross-process direction), and FIG. 9(B) is a side view that indicates how collimating optical subsystem 131F and process-direction optical subsystem 137F act on modulated light portions 118B passed by spatial light modulator 1204 and generate concentrated light portions 118C on scan line SL in a direction perpendicular to the Y-axis (i.e., in the process direction).

Collimating optical subsystem 131F includes a collimating field lens 132F formed in accordance with known techniques that is located immediately after spatial light modulator 120F, and arranged to collimate the light portions that are slightly diverging off of the surface of the spatial light modulator 120F. Collimating optical subsystem 131F is optional, and may be omitted when modulated light portions 118B leaving spatial light modulator 120 are already well collimated.

In the disclosed embodiment cross-process optical subsystem 133F is a two-lens cylindrical or acylindrical projection system that magnifies light in the cross-process (scan) direction (i.e., along the X-axis), and process-direction optical subsystem 137F is a cylindrical or acylindrical single focusing lens subsystem that focuses light in the process (cross-scan) direction (i.e., along the Y-axis). The advantage of this arrangement is that it allows the intensity of the light (e.g., laser) power to be concentrated on scan line SL located at the output of single-pass imaging system 100F. Two-lens cylindrical or acylindrical projection system 133F includes a first cylindrical or acylindrical lens 134F and a second cylindrical or acylindrical lens 136F that are arranged to project and magnify modulated light portions (imaging data) 118B passed by spatial light modulator 120F (and optional collimating optical subsystem 131F) onto an imaging surface (e.g., a cylinder) in the cross process direction. As described in additional detail below, producing a slight fanning out (spreading) of concentrated light portions 118C along the X-axis as indicated in FIG. 9(A) allows the output image to be stitched together without mechanical interference from adjacent optical subsystems. Lens subsystem 137F includes a third cylindrical or acylindrical lens 138F that concentrates the projected imaging data down to a narrow high resolution line image on scan line SL. As the focusing power of lens 138F is increased, the intensity of the light on spatial light modulator 120F is reduced relative to the intensity of the line image generated at scan line SL. However, this means that cylindrical or acylindrical lens 138F must be placed closer to the process surface (e.g., an imaging drum) with a clear aperture extending to the very edges of lens 138F.

According to alternative specific embodiments of the present invention, spatial light modulators 120-1 and 120-2 (see FIG. 1) are implemented using commercially available devices including a digital micromirror device (DMD), such as a digital light processing (DLP®) chip available from Texas Instruments of Dallas Tex., USA, an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. Other spatial light modulator technologies may also be used. While any of a variety of spatial light modulators may be suitable for a particular application, many print/scanning applications today require a resolution 1200 dpi and above, with high image contrast ratios over 10:1, small pixel size, and high speed line addressing over 30 kHz. Based on these specifications, the currently preferred spatial light modulator is the DLP™ chip due to its best overall performance.

FIG. 10 is a perspective view showing a portion of a DMD-type spatial light modulator 120G that is utilized in accordance with a specific embodiment of the present invention. DMD-type spatial light modulator 120G includes a modulating element array 122G made up of multiple microelectromechanical (MEMs) mirror mechanisms 125G. Modulating element array 122G is consistent with DMDs sold by Texas Instruments, wherein MEMs mirror mechanisms 125G are arranged in a rectangular array on a semiconductor substrate (i.e., "chip" or support structure) 124G. Mirror mechanisms 125G are controlled as described low by a controller circuit 126G that also is fabricated on substrate 124G according to known semiconductor processing techniques, and is disposed below mirrors 125G. Although only sixty-four mirror mechanisms 125G are shown in FIG. 7 for illustrative purposes, those skilled in the art will understand that any number of mirror mechanisms are disposed on DMD-type modulating element array 122G, and that DMDs sold by Texas Instruments typically include several hundred thousand mirrors per device.

FIG. 11 is a combination exploded perspective view and simplified block diagram showing an exemplary mirror mechanism 125G-11 of DMD-type modulating element array 122G (see FIG. 10) in additional detail. For descriptive purposes, mirror mechanism 25G-11 is segmented into an uppermost layer 210, a central region 220, and a lower region 230, all of which being disposed on a passivation layer (not shown) formed on an upper surface of substrate 124G. Uppermost layer 210 of mirror mechanism 125G-11 includes a square or rectangular mirror (light modulating structure) 212 that is made out of aluminum and is typically approximately 16 micrometers across. Central region 220 includes a yoke 222 that connected by two compliant torsion hinges 224 to support plates 225, and a pair of raised electrodes 227 and 228. Lower region 230 includes first and second electrode plates 231 and 232, and a bias plate 235. In addition, mirror mechanism 125G-11 is controlled by an associated SRAM-type control (memory) cell 128G (i.e., a bi-stable flip-flop) that is disposed on substrate 124G and addressed using a random access memory format similar to that described above with reference to FIGS. 6(A) to 6(C) to store either of two data states by way of control bit signal 127G-1, which is generated by controller 126G in accordance with image data as described in additional detail below. Memory cell 128G generates complementary control signal 127G (i.e., output signals D and D-bar) that is generated from the current stored state according to known techniques.

Lower region 230 is formed by etching a plating layer or otherwise forming metal pads on a passivation layer (not shown) formed on an upper surface of substrate 124G over memory cell 128G. Note that electrode plates 231 and 232 are respectively connected to receive either a bias control signal 127G-2 (which is selectively transmitted from controller 126G in accordance with the operating scheme set forth below) or complementary control signal 127G by memory cell 128G by way of metal vias or other conductive structures that extend through the passivation layer.

Central region 220 is disposed over lower region 230 using MEMS technology, where yoke 222 is movably (pivotably) connected and supported by support plates 225 by way of compliant torsion hinges 224, which twist as described below to facilitate tilting of yoke 222 relative to substrate 124G. Support plates 225 are disposed above and electrically connected to bias plate 235 by way of support posts 226 (one shown) that are fixedly connected onto regions 236 of bias plate 235. Electrode plates 227 and 228 are similarly disposed above and electrically connected to electrode plates 231 and 232, respectively, by way of support posts 229 (one shown) that are fixedly connected onto regions 233 of electrode plates 231 and 232. Finally, mirror 212 is fixedly connected to yoke 222 by a mirror post 214 that is attached onto a central region 223 of yoke 222.

Figure 12:
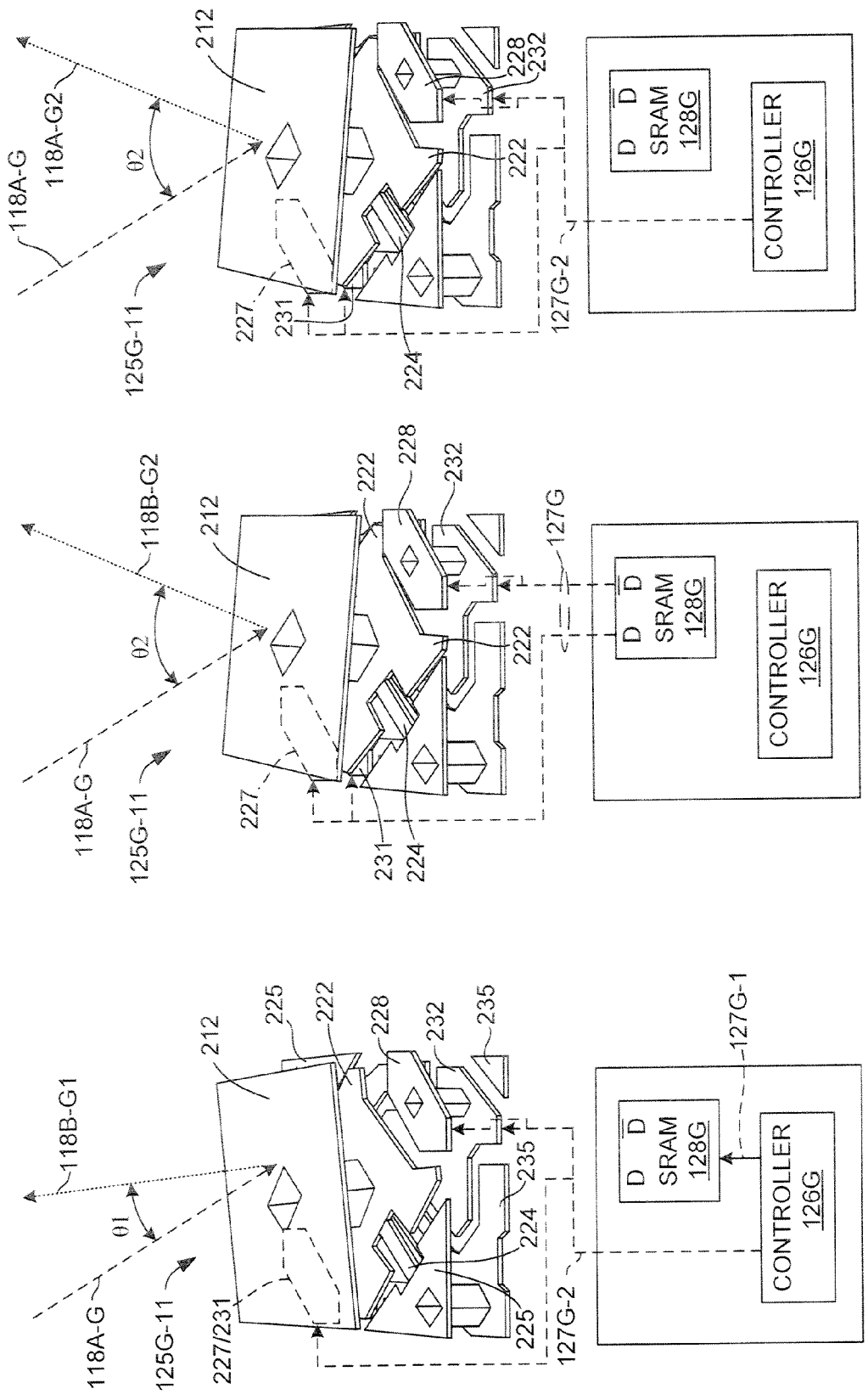
FIGS. 12(A), 12(B) and 12(C) are perspective views showing the light modulating element of FIG. 11 during operation.

FIGS. 12(A) to 12(C) are perspective/block views showing mirror mechanism 125G-11 of FIG. 10 during operation. FIG. 12(A) shows mirror mechanism 125G-11 in a first (e.g., "on") modulating state in which received light portion 118G-11 is reflected from mirror 212 at a first angle θ1. To set the "on" modulating state, SRAM memory cell 128G stores a previously written data value such that the "D" portion of control signal 127G includes a high voltage (VDD) that is transmitted to electrode plate 231 and raised electrode 227, and the "D-bar" portion of control signal 127G includes a low voltage (ground) that is transmitted to electrode plate 232 and raised electrode 228. These electrodes control the position of the mirror by electrostatic attraction. The electrode pair formed by electrode plates 231 and 232 is positioned to act on yoke 222, and the electrode pair formed by raised electrodes 227 and 228 is positioned to act on mirror 212. The majority of the time, equal bias charges are applied to both sides of yoke 222 simultaneously (e.g., as indicated in FIG. 12(A), bias control signal 127G-2 is applied to both electrode plates 227 and 228 and raised electrodes 231 and 232). Instead of flipping to a central position, as one might expect, this equal bias actually holds mirror 122 in its current "on" position because the attraction force between mirror 122 and raised electrode 231/electrode plate 227 is greater (i.e., because that side is closer to the electrodes) than the attraction force between mirror 122 and raised electrode 232/electrode plate 228.

To move mirror 212 from the "on" position to the "off" position, the required image data bit is loaded into SRAM memory cell 128G by way of control bit signal 127G-1 (see the lower portion of FIG. 12(A)). As indicated in FIG. 12(A), once all the SRAM cells of array 122G have been loaded with image data, the bias control signal is de-asserted, thereby transmitting the "D" portion of control signal 127G from SRAM cell 128G to electrode plate 231 and raised electrode 227, and the "D-bar" portion of control signal 127G from SRAM cell 128G to electrode plate 232 and raised electrode 228, thereby causing mirror 212 to move into the "off" position shown in FIG. 12(B), whereby received light portion 118G-11 is reflected from mirror 212 at a second angle θ2. In one embodiment, the flat upper surface of mirror 212 tilts (angularly moves) in the range of approximately 10 to 12° between the "on" state illustrated in FIG. 12(A) and the "off" state illustrated in FIG. 12(B). When bias control signal 127G-2 is subsequently restored, as indicated in FIG. 12(C), mirror 212 is maintained in the "off" position, and the next required movement can be loaded into memory cell 128G. This bias system is used because it reduces the voltage levels required to address the mirrors such that they can be driven directly from the SRAM cells, and also because the bias voltage can be removed at the same time for the whole chip, so every mirror moves at the same instant.

As indicated in FIGS. 12(A) to 12(C), the rotation torsional axis of mirror mechanism 125G-11 causes mirrors 212 to rotate about a diagonal axis relative to the x-y coordinates of the DLP chip housing. This diagonal tilting requires that the incident light portions received from the spatial light modulator be projected onto each mirror mechanism 125G at a compound incident angle so that the exit angle of the light is perpendicular to the surface of the DLP chip. This requirement complicates the side by side placement of DMD-type spatial light modulator 120G relative to the other components (e.g., the associated anamorphic optical system) within an imaging apparatus.

Figure 13:
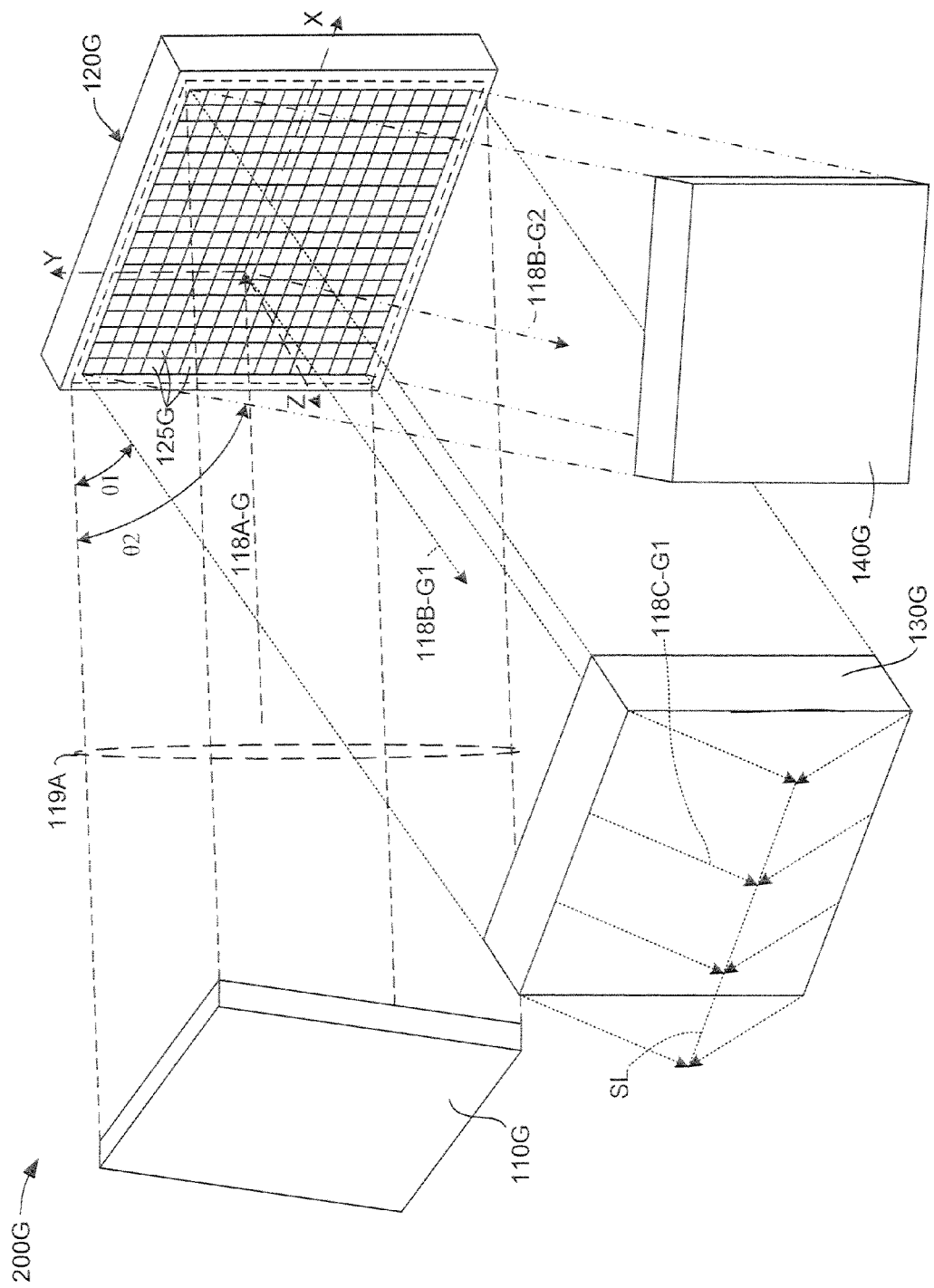
FIG. 13 is a simplified diagram showing a portion of an imaging apparatus including the DMD-type spatial light modulator of FIG. 10 in a folded arrangement according to a specific embodiment of the present invention.

FIG. 13 is a simplified perspective view showing a portion of an imaging apparatus 200G including a DMD-type spatial light modulator 120G, which is similar to spatial light modulator 120G described above with reference to FIGS. 10-13), where DMD-type spatial light modulator 120G is disposed in a preferred "folded" arrangement according to another embodiment of the present invention. Similar to the generalized apparatus 200 discussed above with reference to FIG. 2, imaging apparatus 200G includes a homogenous light generator 110G and an associated anamorphic optical system 130G that function and operate as described above. Imaging apparatus 200G is distinguished from the generalized system in that spatial light modulator 120G is positioned relative to homogenous light generator 110G and anamorphic optical system 130G at a compound angle such that incident homogenous light portions 118A-G of homogenous light field 119A are neither parallel nor perpendicular to any of the orthogonal axes X, Y or Z defined by the surface of spatial light modulator 120G, and the reflected light portions 118B-G1 and 118B-G2 (respectively produced when the mirrors are in the "on" and "off" positions) are directed substantially normal or perpendicular to the surface of spatial light modulator 120G along the Z direction through the anamorphic projection optical system 130G in the "on" mirror position, and directed outside of the anamorphic projection optical system 130G to a light absorbing beam stop 140G in the "off" mirror position. With the components of imaging apparatus 200G positioned in this "folded" arrangement, portions of homogenous light portion 118A-G directed to spatial light modulator 120G from homogenous light generator 110G are reflected from each MEMs mirror mechanism 125G to anamorphic optical system 130G only when the mirrors of each MEMs mirror mechanism 125G are in the "on" position (e.g., as described above with reference to FIG. 12(A)). That is, as indicated in FIG. 13, each MEMs mirror mechanism 125G that is in the "on" position reflects an associated one of light portions 118A-G at angle θ1 relative to the incident light direction, whereby modulated light portions 118B-1 are directed by spatial light modulator 120G along corresponding predetermined directions to anamorphic optical system 130G, which is positioned and arranged to direct concentrated light portions 118C-G1 onto scan line SL, where scan line SL is perpendicular to the Z-axis defined by the surface of spatial light modulator 120G and the scan line SL is parallel to the X-axis.

Conversely, each MEMs mirror mechanism 125G that is in the "off" position reflects an associated one of light portions 118A-G at angle θ2, whereby modulated light portions 118B-G2 are directed by spatial light modulator 120G away from anamorphic optical system 130G. According to an aspect of the preferred "folded" arrangement, imaging apparatus 200G includes a beam stop heat sink structure 140G that is positioned to receive modulated light portions 118B-G2 that are reflected by MEMs mirror mechanisms 125G in the "off" position. According to another aspect of the preferred "folded" arrangement using the compound incident angle design set forth above, the components of imaging apparatus 200G are arranged in a manner that facilitates the construction of a seamless assembly including any number of identical imaging systems, such as described in co-owned and co-pending application Ser. No. 13/216,588, entitled VARIABLE LENGTH IMAGING APPARATUS USING ELECTRONICALLY REGISTERED AND STITCHED SINGLE-PASS IMAGING SYSTEMS, which is incorporated herein by reference in its entirety.

Figure 14A:
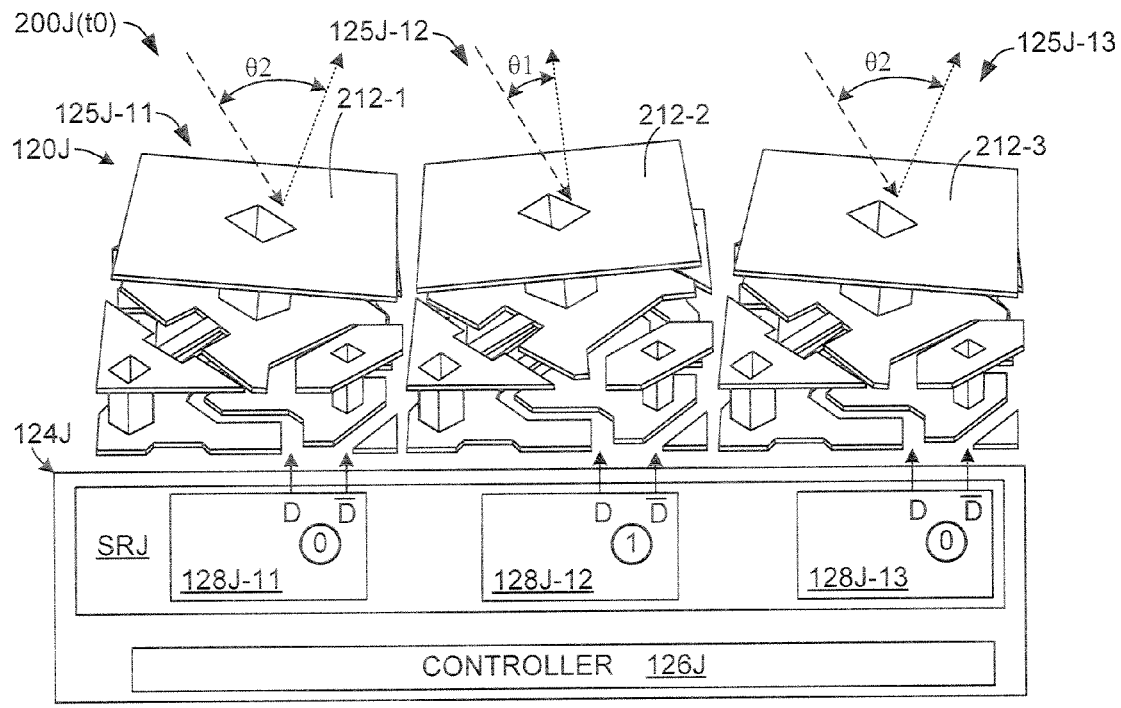
FIGS. 14(A) and 14(B) are simplified diagrams showing a portion of an imaging apparatus including a DMD-type spatial light modulator modified to include a shift register circuit according to another specific embodiment of the present invention.
Figure 14B:
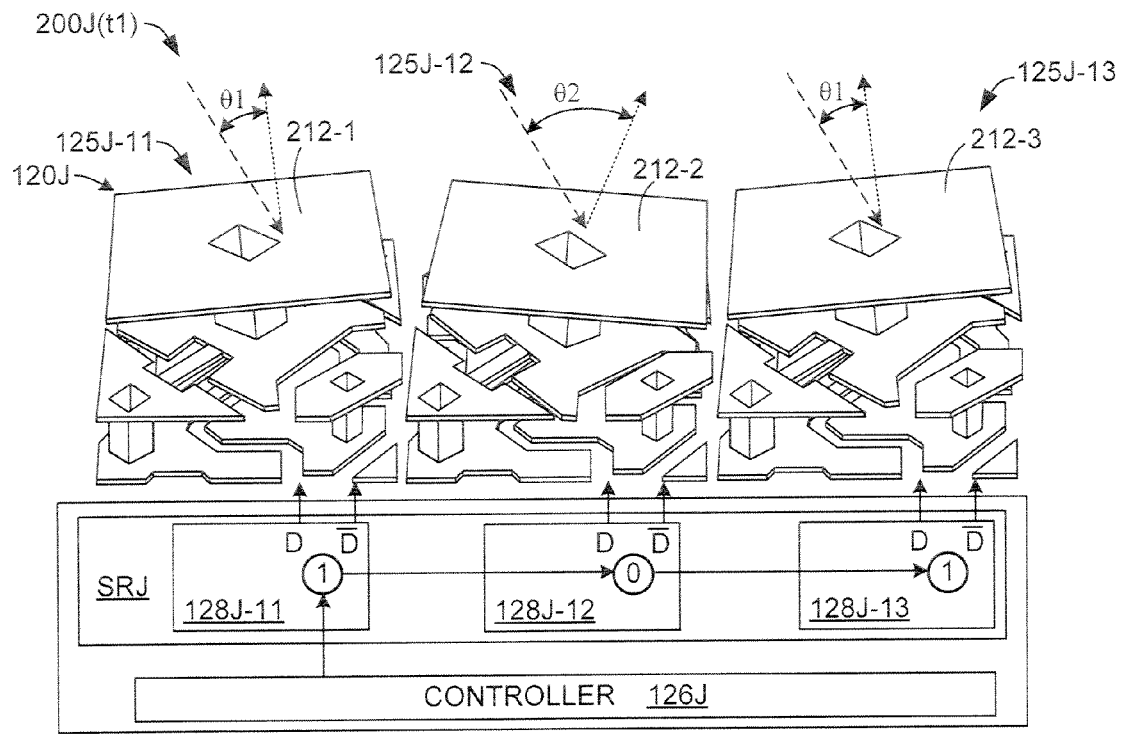

FIGS. 14(A) and 14(B) are simplified diagrams showing a portion of an imaging apparatus 200(J) including a DMD-type spatial light modulator 120J according to another specific embodiment of the present invention. Referring to FIG. 14(A), DMD-type spatial light modulator 120J includes an array of MEMs mirror mechanisms, of which MEMs mirror mechanisms 125J-11, 125J-12 and 125J-13 are shown for illustrative purposes, that are formed on a substrate 124J over corresponding control cells 128J-11, 128J-12 and 128J-13. In accordance with the present embodiment, DMD-type spatial light modulator 120J differs from DMD-type spatial light modulator 120J in that spatial light modulator 120J is modified to include a shift register circuit SRJ that are constructed according to known techniques to facilitate shifting the data bit values between control cells 128J-11, 128J-12 and 128J-13, thereby facilitating the scrolling (rastering) of scan data in a manner similar to that described above with reference to FIGS. 7(A) to 7(C). For example, FIG. 14(A) illustrates DMD-type spatial light modulator 120J at an initial time t0 when control cells 128J-11, 128J-12 and 128J-13 respectively store bit values "0", "1" and "0", whereby mirrors 212-1 and 212-3 of MEMs mirror mechanisms 125J-11 and 125J-13 are disposed in the "off" modulated state, and mirror 212-2 of MEMs mirror mechanism 125J-12 is disposed in the "on" modulated state. FIG. 14(B) illustrates DMD-type spatial light modulator 120J at a subsequent time t1 when controller 126J writes a "1" bit value into control cell 128J-11. Due to the presence of shift register circuit SRJ, the "0" bit value previously stored in control cell 128J-11 is shifted to control cell 128J-12, and the "1" bit value previously stored in control cell 128J-12 is shifted to control cell 128J-13. With control cells 128J-11, 128J-12 and 128J-13 now respectively store bit values "1", "0" and "1", mirrors 212-1 and 212-3 of MEMs mirror mechanisms 125J-11 and 125J-13 are disposed in the "on" modulated state, and mirror 212-2 of MEMs mirror mechanism 125J-12 is disposed in the "off" modulated state. By modifying the memory architecture from the random access memory format utilized in DMD-type spatial light modulator 120J to the shift register format illustrated in DMD-type spatial light modulator 120J, the present embodiment reduces the bandwidth requirements by a factor of the reciprocal of the number of mirror rows (e.g., in DMD-type spatial light modulators having 1,000 mirrors per row, the shift register format reduces the bandwidth requirements by a factor of 1,000).

Figure 15:
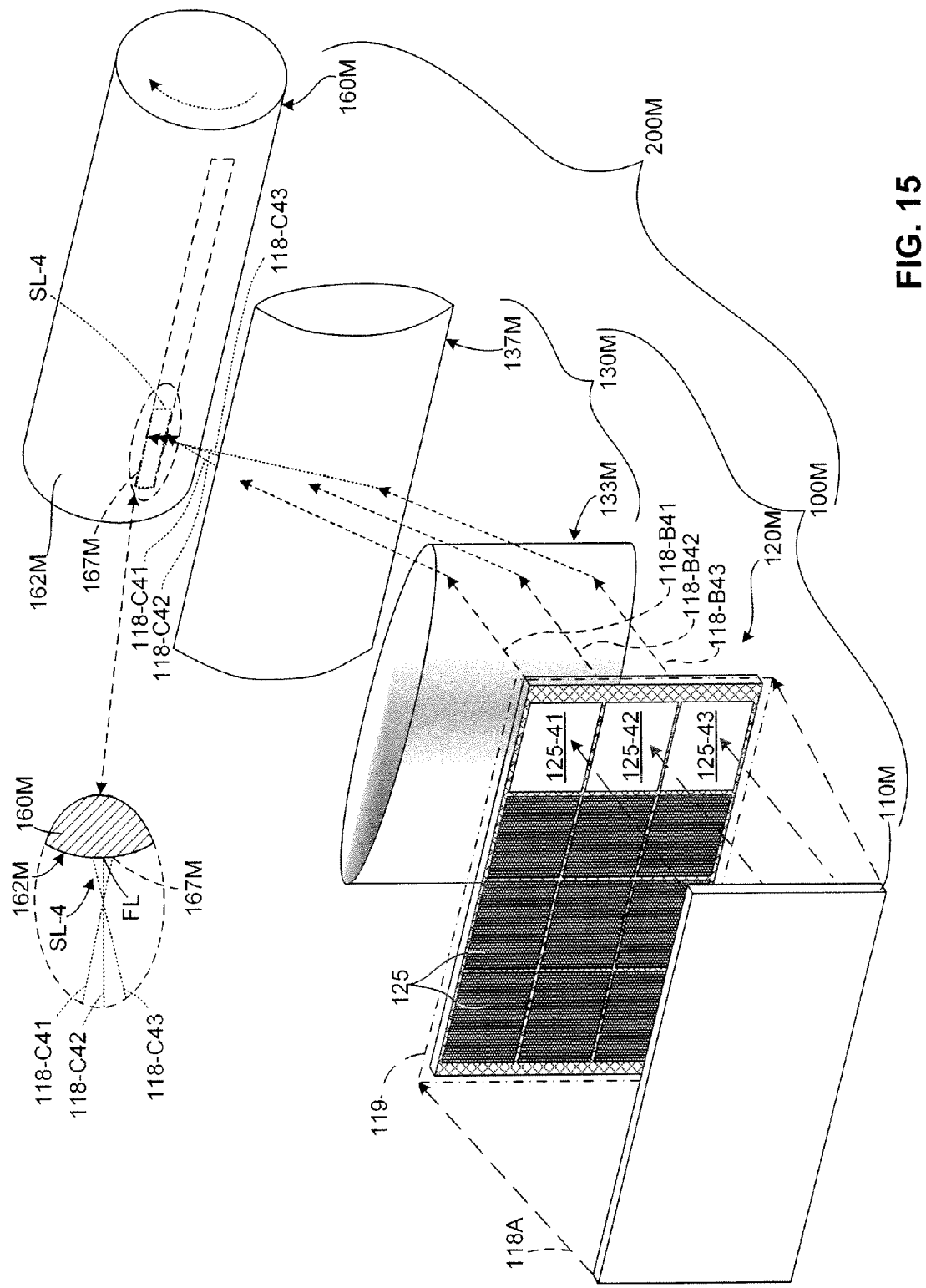
FIG. 15 is a perspective view showing an imaging apparatus according to another specific embodiment of the present invention.

FIG. 15 is a simplified perspective view showing a scanning/printing apparatus 200M that includes single-pass imaging system 100M and a scan structure (e.g., an imaging drum cylinder) 160M according to another embodiment of the present invention. As described above, imaging system 100M generally includes a homogenous light generator 110M, a spatial light modulator 120M, and an anamorphic optical (e.g., projection lens) system 130M that function essentially as set forth above. Referring to upper right portion of FIG. 15, imaging drum cylinder (roller) 160M is positioned relative to image system 100M such that anamorphic optical system 130M images and concentrates the modulated light portions received from spatial light modulator 120M onto an imaging surface 162M of imaging drum cylinder 160M, and in particular into an imaging region 167M of imaging surface 162M, using a cross-process optical subsystem 133M and a process-direction optical subsystem 137M in accordance with the technique described above with reference to FIGS. 9(A) and 9(B). In a presently preferred embodiment, cross-process optical subsystem 133M acts to horizontally invert the light passed through spatial light modulator 120M (i.e., such that light portions 118B-41, 118B-42 and 118B-43 are directed from the right side of cross-process optical subsystem 133M toward the left side of imaging region 167M). In addition, in alternative embodiments, imaging drum cylinder 160M is either positioned such that imaging surface 162M coincides with the scan (or focal) line defined by anamorphic optical system 130M, whereby the concentrated light portions (e.g., concentrated light portions 118C-41, 118C-42 and 118C-43) concentrate to form a single one-dimensional spot (light pixel) SL-4 in an associated portion of imaging region 167M, or such that imaging surface 162M is coincident with the focal line defined by anamorphic optical system 130M, whereby the light portions form a swath containing a few imaging lines (i.e., such that the light sub-pixel formed by light portion 118C-41 is separated from the light sub-pixel formed by light portion 118C-43). In a presently preferred embodiment, as indicated by the dashed-line bubble in the upper right portion of FIG. 15, which shows a side view of imaging drum cylinder 160M, imaging surface 162M is set at the focal line FL location such that the image generated at scan line SL-4 by beams 118C-41, 118C-42 and 118C-43 is inverted in the fashion indicated in the dashed-line bubble. Additional details regarding anamorphic optical system 130M are described in co-owned and co-pending application Ser. No. 13/216,976, entitled ANAMORPHIC PROJECTION OPTICAL SYSTEM, now U.S. Pat. No. 8,405,913, which is incorporated herein by reference in its entirety.

Although the present invention has been described with respect to certain specific embodiments, it will be clear to those skilled in the art that the inventive features of the present invention are applicable to other embodiments as well, all of which are intended to fall within the scope of the present invention. For example, although the present invention is illustrated as having light paths that are linear (see FIG. 2) or with having one fold (see FIG. 11), other arrangements may be contemplated by those skilled in the art that include folding along any number of arbitrary light paths.

The invention claimed is:

1. An apparatus for generating an elongated concentrated scan image in response to predetermined scan image data, the apparatus comprising:
    a spatial light modulator including a plurality of light modulating elements arranged in a two-dimensional array, each light modulating element including a light modulating structure and an associated control cell for storing an associated image data bit value, said each light modulating element being disposed such that said light modulating structure receives an associated light portion of a substantially uniform two-dimensional homogenous light field and is controlled according to the associated image data bit value between a first modulated state and a second modulated state, wherein when the light modulating structure of said each modulating element is in said first modulated state said each modulating element directs said received associated light portion in a corresponding predetermined direction, and when said light modulating structure of said each modulating element is in said second modulated state, said received associated light portion is prevented from passing along said corresponding predetermined direction by said each modulating element;
    an anamorphic optical system positioned to receive a modulated light field including modulated light portions directed by each of the plurality of light modulating elements disposed in the first modulated state, and configured to generate an associated anamorphically concentrated light field in response to said receive modulated light field;
    a scan structure having a movable imaging surface and positioned relative to the anamorphic optical system such that the anamorphically converged light field forms said elongated concentrated scan image on an elongated imaging region defined on the imaging surface; and
    an image position controller including means for synchronizing a cross-scan movement of the imaging surface with the modulated states of said plurality of light modulating elements in accordance with said predetermined scan image data by causing image data bit values to shift between predetermined selected modulating elements of the plurality of light modulating elements such that an image feature of said elongated concentrated scan image scrolls in the cross-scan direction at a same rate as said cross-scan movement of the imaging surface,
    wherein the anamorphic optical system includes a cross-process optical subsystem including first and second cylindrical or acylindrical focusing lenses arranged to image and project said received light portions onto the elongated imaging region in a cross-process direction, and
    wherein the anamorphic optical system further comprises a process-direction optical subsystem including a third cylindrical or acylindrical focusing lens arranged to focus said light portions received from the cross-process optical subsystem onto the elongated imaging region in a process direction.

2. The apparatus according to claim 1,
    wherein the plurality of light modulating elements are arranged in a plurality of rows and a plurality of columns, wherein each said column includes an associated group of said plurality of light modulating elements,
    wherein the anamorphic optical system is arranged to concentrate modulated light portions received from each associated group of said plurality of light modulating elements of each said column onto an associated scan line portion of said elongated concentrated scan image, and
    wherein said image position controller includes data control means for writing said image data bit values between each associated group of said plurality of light modulating elements of each said column such that each said image data bit value is sequentially shifted between adjacent light modulating elements of each said associated group.

3. The apparatus according to claim 1, wherein said data shifting means includes means for generating a first data frame including data bits for each of the plurality of light modulating elements, for transmitting the first data frame to the plurality of light modulating elements, for generating a modified data frame by shifting some of said data bit values associated with a first group of the plurality of light modulating elements and incorporating into said modified data frame a new set of data bit values for a second group of the plurality of light modulating elements.

4. The apparatus according to claim 2, wherein said spatial light modulator further comprises at least one shift register circuit including means for shifting a data bit value from the associated control cell of a first modulating element of the plurality of light modulating elements to the associated control cell of a second modulating element of the plurality of light modulating elements when a new data bit value is written by the image position controller to the associated control cell of the first modulating element.

5. The apparatus according to claim 1, wherein the spatial light modulator comprises one of a digital micromirror device, an electro-optic diffractive modulator array, and an array of thermo-optic absorber elements.

6. The apparatus according to claim 1,
    wherein each of the plurality of light modulating elements of the spatial light modulator comprises a microelectromechanical (MEMs) mirror mechanism disposed on a substrate, and
    wherein each MEMs mirror mechanism includes a mirror and means for supporting and moving the mirror in accordance with said associated image data bit value between a first tilted position relative to the substrate and a second tilted position relative to the substrate.

7. The apparatus according to claim 6, wherein said spatial light modulator further comprises at least one shift register circuit including means for shifting a data bit value from the associated control cell of a first modulating element of the plurality of light modulating elements to the associated control cell of a second modulating element of the plurality of light modulating elements.

8. The apparatus according to claim 6, wherein the spatial light modulator and the anamorphic optical system are cooperatively positioned such that, when the mirror of each said MEMs mirror mechanism of said spatial light modulator is in the first tilted position, said mirror reflects said associated received light portion to the anamorphic optical system, and when said mirror of each said MEMs mirror mechanism is in the second tilted position, said mirror reflects said associated received light portion away from the anamorphic optical system.

9. The apparatus according to claim 8, further comprising a heat sink fixedly positioned relative to said spatial light modulator such that when said mirror of each said MEMs mirror mechanism is in the second tilted position, said mirror reflects said associated received light portion onto said heat sink.

10. An apparatus comprising:
at least one homogenous light source for generating homogenous light,
a spatial light modulator including:
  a plurality of light modulating elements arranged in a two-dimensional array and disposed such that a light modulating structure of each said modulating element receives an associated portion of the homogenous light, and
  one or more shift register circuits including a plurality of control cells and means for sequentially shifting data bit values between adjacent pairs of the plurality of control cells,
  wherein each of the plurality of light modulating elements is controlled by a corresponding control cell of the plurality of control cells such that the light modulating structure of said each modulating element is disposed in a first modulated state when said corresponding control cell stores a first data bit value and is disposed in a second modulated state when said corresponding control cell stores a second data bit value, and wherein when the light modulating structure of said each modulating element is in said first modulated state, said each modulating element directs said associated received homogenous light portion in a corresponding predetermined direction, and when said light modulating structure of said each modulating element is in said second modulated state, said associated received light portion is prevented from passing along said corresponding predetermined direction by said each modulating element;
an anamorphic optical system positioned to receive a modulated light field including modulated light portions directed by each of the plurality of light modulating elements disposed in the first modulated state, and configured to generate an associated anamorphically concentrated light field in response to said receive modulated light field; and
a scan structure having a movable imaging surface and positioned relative to the anamorphic optical system such that the anamorphically converged light field forms an elongated concentrated scan image on an elongated imaging region defined on the imaging surface,
wherein the anamorphic optical system includes a cross-process optical subsystem including first and second cylindrical or acylindrical focusing lenses arranged to image and project said received light portions onto the elongated imaging region in a cross-process direction, and
wherein the anamorphic optical system further comprises a process-direction optical subsystem including a third cylindrical or acylindrical focusing lens arranged to focus said light portions received from the cross-process optical subsystem onto the elongated imaging region in a process direction.

11. The apparatus of claim 10, further comprising an image position controller including means for synchronizing a cross-scan movement of the imaging surface of the scan structure with the modulated states of said plurality of light modulating elements in accordance with predetermined scan line image data by causing said one or more shift register circuits to shift image data bit values between said adjacent pairs of the plurality of control cells such that an image feature of said elongated concentrated scan image is displaced in the cross-scan direction in synchronization with said cross-scan movement of the imaging surface.

12. The apparatus according to claim 10,
wherein the plurality of light modulating elements are arranged in a plurality of rows and a plurality of columns, wherein each said column includes an associated group of said plurality of light modulating elements,
wherein the one or more shift register circuits includes a plurality of shift register circuits, each shift register circuit including a group of said control cells corresponding to a corresponding associated group of said plurality of light modulating elements of a corresponding column.

13. The apparatus according to claim 12, further comprising means for writing a frame of said data bit values into said plurality of shift register circuits and for controlling said plurality of shift register circuits in accordance with predetermined scan line image data such that first data bit values are shifted from first control cells of each said shift register into second control cells of each said shift register, and second data bit values of the frame are written into the first control cells of each said shift register.

14. The apparatus according to claim 12, wherein the spatial light modulator comprise one of a digital micromirror device, an electro-optic diffractive modulator array, and an array of thermo-optic absorber elements.

15. The apparatus according to claim 10,
wherein each of the plurality of light modulating elements of the spatial light modulator comprises a microelectromechanical (MEMs) mirror mechanism disposed on a substrate, and
wherein each MEMs mirror mechanism includes a mirror and means for supporting and moving the mirror in accordance with said associated image data bit value between a first tilted position relative to the substrate and a second tilted position relative to the substrate.

16. An apparatus comprising:
at least one homogenous light source for generating homogenous light,
a spatial light modulator including:
  a plurality of light modulating elements arranged in a two-dimensional array, each of the plurality of light modulating elements including a microelectromechanical (MEMs) mirror mechanism disposed on a substrate, wherein each MEMs mirror mechanism includes a mirror and means for movably supporting the mirror, said plurality of light modulating elements being disposed such that said mirror of each said modulating element receives an associated portion of the homogenous light, and
  one or more shift register circuits including a plurality of control cells and means for sequentially shifting data bit values between adjacent pairs of the plurality of control cells, wherein each of the plurality of light modulating elements is controlled by a corresponding control cell of the plurality of control cells such that the mirror of said each modulating element is disposed in a first modulated position when said corresponding control cell stores a first data bit value and is disposed in a second modulated position when said corresponding control cell stores a second data bit value; and an anamorphic optical system positioned to receive a modulated light field including modulated light portions directed by each of the plurality of light modulating elements disposed in the first modulated position, and configured to generate an associated anamorphically concentrated light field in response to said receive modulated light field, wherein the anamorphic optical system includes a cross-process optical subsystem including first and second cylindrical or acylindrical focusing lenses arranged to image and project said received light portions onto the elongated imaging region in a cross-process direction, and wherein the anamorphic optical system further comprises a process-direction optical subsystem including a third cylindrical or acylindrical focusing lens arranged to focus said light portions received from the cross-process optical subsystem onto the elongated imaging region in a process direction.

\* \* \* \* \*